US008711774B2

(12) United States Patent
Tamaki

(10) Patent No.: US 8,711,774 B2
(45) Date of Patent: Apr. 29, 2014

(54) WIRELESS COMMUNICATION SYSTEM AND WIRELESS COMMUNICATION METHOD

(75) Inventor: Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 13/056,401

(22) PCT Filed: Jul. 29, 2009

(86) PCT No.: PCT/JP2009/063507
§ 371 (c)(1),
(2), (4) Date: Jan. 28, 2011

(87) PCT Pub. No.: WO2010/013751
PCT Pub. Date: Feb. 4, 2010

(65) Prior Publication Data
US 2011/0134848 A1 Jun. 9, 2011

(30) Foreign Application Priority Data

Jul. 30, 2008 (JP) .................................. 2008-195691

(51) Int. Cl.
*H04W 80/04* (2009.01)
*H04W 16/28* (2009.01)

(52) U.S. Cl.
USPC .................... 370/328; 370/208; 455/562.1

(58) Field of Classification Search
USPC ......... 370/321–322, 330, 334, 337, 345, 347, 370/348, 440, 442, 477, 465–469
See application file for complete search history.

(56) References Cited

U.S. PATENT DOCUMENTS

2005/0002325 A1* 1/2005 Giannakis et al. ............ 370/208
2007/0093273 A1* 4/2007 Cai ............................ 455/562.1

(Continued)

FOREIGN PATENT DOCUMENTS

CN 1953574 4/2007
JP 2005-102136 4/2005

(Continued)

OTHER PUBLICATIONS

Max H. M. Costa, Writing on Dirty Paper, IEEE Transactions on Information Theory, May 1983, pp. 439-441, vol. IT-29, No. 3.

(Continued)

*Primary Examiner* — Un C Cho
*Assistant Examiner* — M Mostazir Rahman
(74) *Attorney, Agent, or Firm* — Antonelli, Terry, Stout & Krauss, LLP.

(57) ABSTRACT

There is provided a wireless communication system in which a feedback volume is reduced as exceeding a communication speed demanded by a mobile station. The wireless communication system includes: a plurality of base stations 102a and 102b having a plurality of antennas; a plurality of mobile stations 103a to 103d having a plurality of antennas; and a base station controller 101a collectively controlling a plurality of the base stations. During a certain period of time (time slot), there are provided an (MIMO+TDMA) communication mode by which only one of the base stations and one of the mobile stations are communicated with each other, an (SDMA+TDMA) communication mode by which one of the base stations and the plurality of the mobile stations are simultaneously communicated with each other, and a (multipoint SDMA) communication mode by which the plurality of the base stations and the plurality of the mobile stations are simultaneously communicated with each other by coordinating the plurality of the base stations with each other by the base station controller. And, it is judged by the base station or the base station controller whether or not the communication speed requested from the mobile station can be exceeded, so that an appropriate communication mode is automatically decided by switching the communication modes.

12 Claims, 18 Drawing Sheets

(56) References Cited

U.S. PATENT DOCUMENTS

| | | | |
|---|---|---|---|
| 2007/0105595 A1* | 5/2007 | Prasad et al. | 455/562.1 |
| 2007/0281746 A1* | 12/2007 | Takano et al. | 455/562.1 |
| 2008/0220792 A1* | 9/2008 | Fischer | 455/452.2 |
| 2011/0105170 A1* | 5/2011 | Gan et al. | 455/509 |

FOREIGN PATENT DOCUMENTS

| | | |
|---|---|---|
| JP | 2007-502071 | 2/2007 |
| JP | 2007-096727 | 4/2007 |
| JP | 2008-92433 | 4/2008 |

OTHER PUBLICATIONS

Wei Yu et al.; Sum Capacity of Gaussian Vector Broadcast Channels, et al., IEEE Transactions on Information Theory, Sep. 2004, pp. 1875-1892, vol. 50, No. 9.

Shlomo Shamia (Shitz) et al., Enhancing the Cellular Downlink Capacity via Co-Processing at the Transmitting End, Proceedings of IEEE Vehicular Tech. Conf., May 2001, pp. 1745-1749.

Takeo Ohgane et al, Applications of Space Division Multiplexing and Those Performance in a MIMO Channel, Sep. 2004, pp. 1162-1173, Transactions of the Institute of Electronics, Information and Communication Engineers, B vol. J-87_B, No. 9.

Zhi Min et al., An Improved User Selection Algorithm in Multiuser MIMO Broadcast with Channel Prediction, IEICE Technical Report, RCS2008-11(May 2008).

JP Office Action for Japanese Application No. 2010-522741, dated Sep. 4, 2012.

Shinji Murai, et al., Wireless Resource Allocation Methods based on QoS in MIMO-SDMA/TDMA System, IEICE Technical Report, RCS2006-65, Jul. 2006.

Office Action issued in Chinese Patent Application No. 200980129934.2 on Apr. 15, 2013.

\* cited by examiner

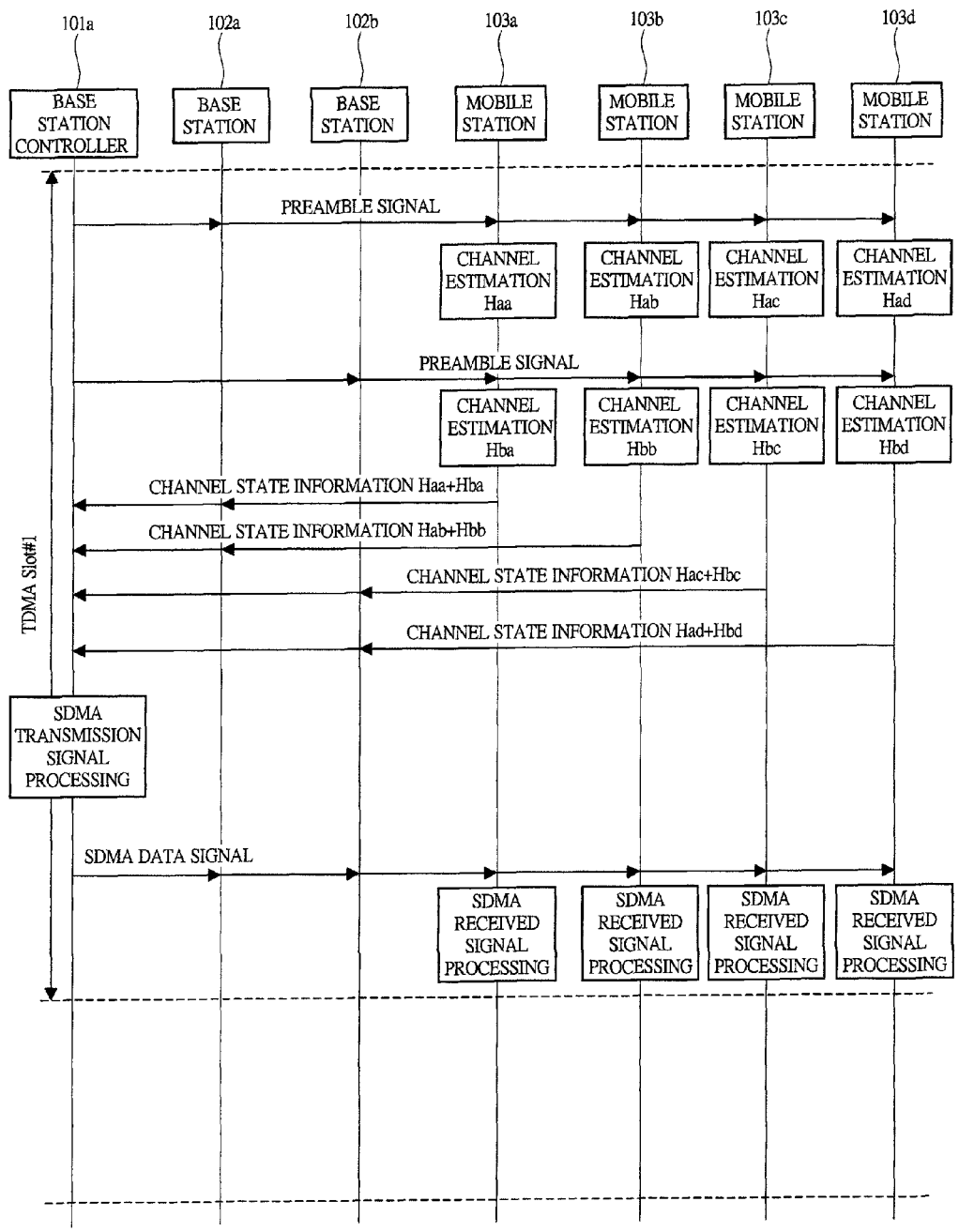

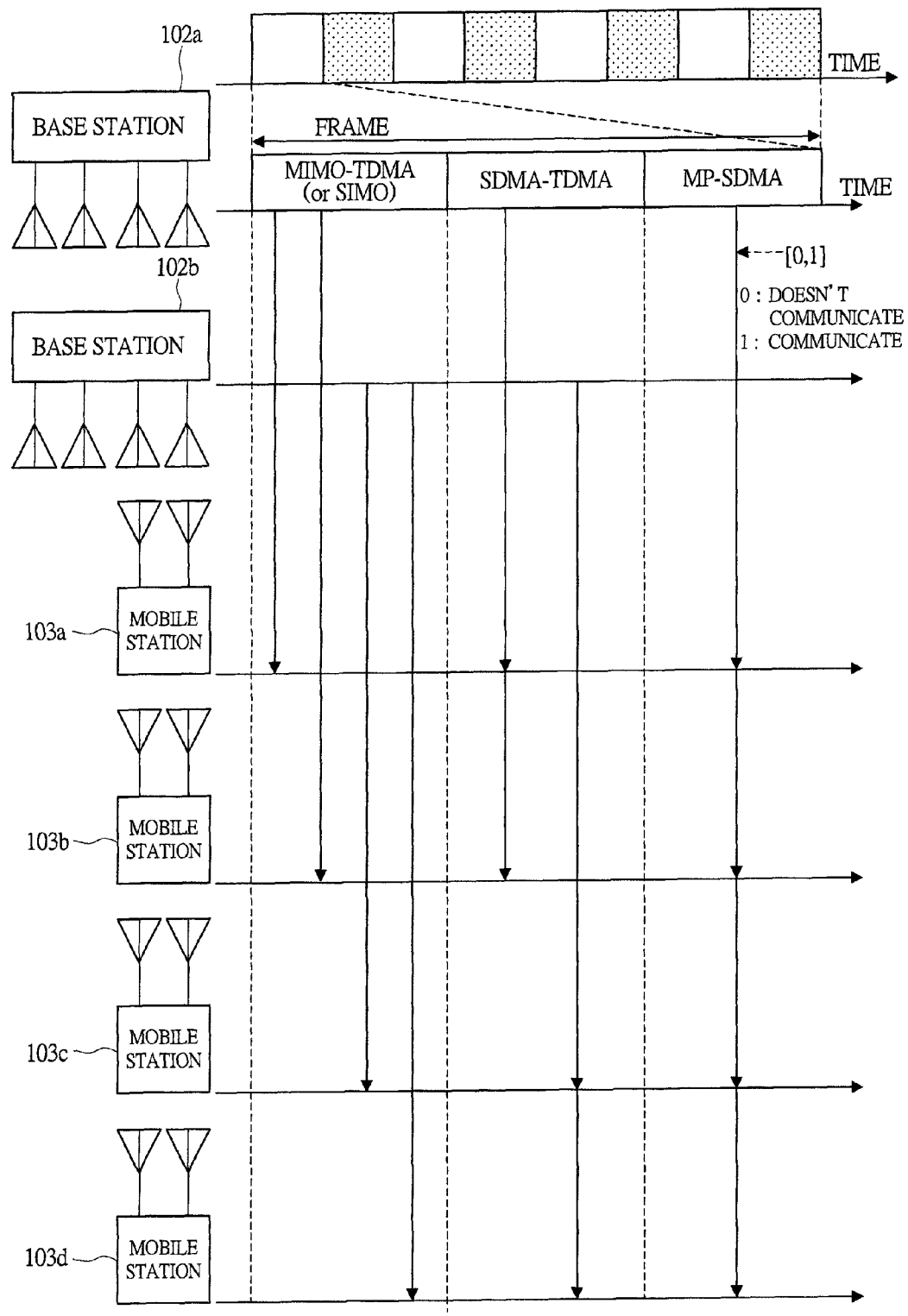

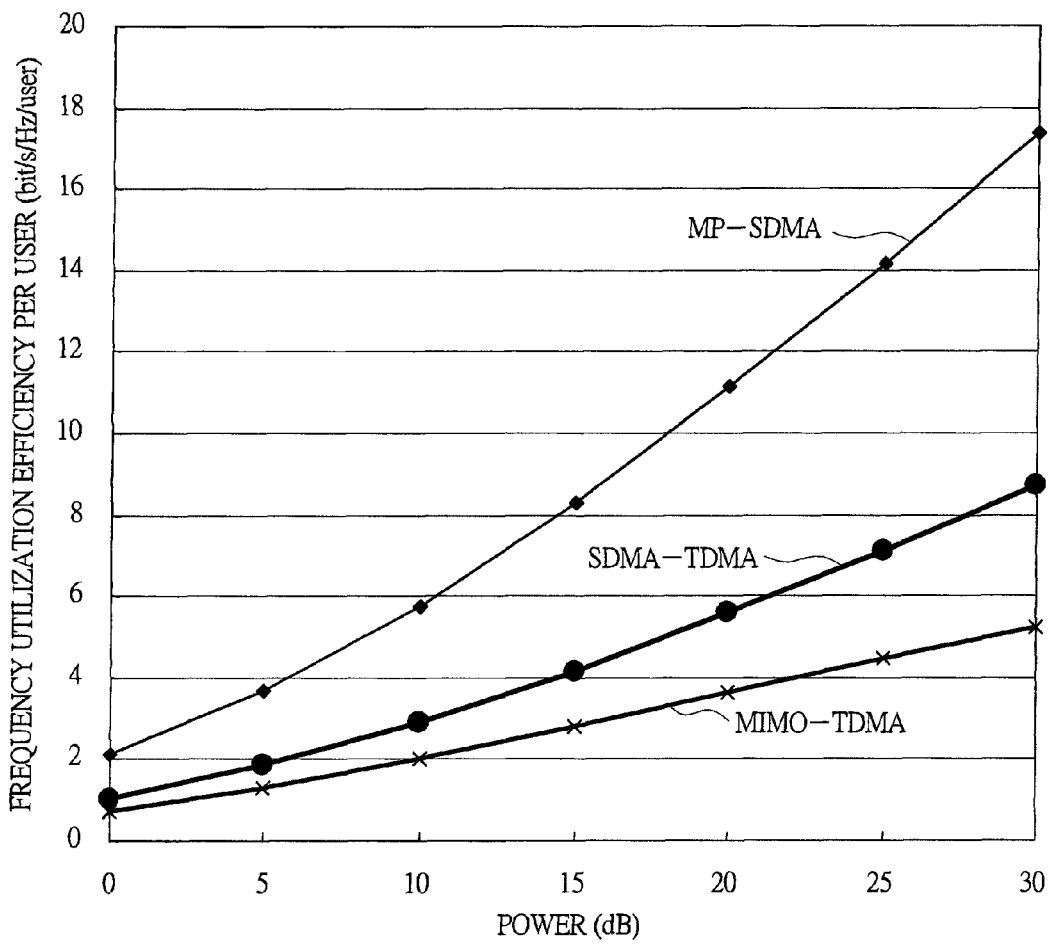

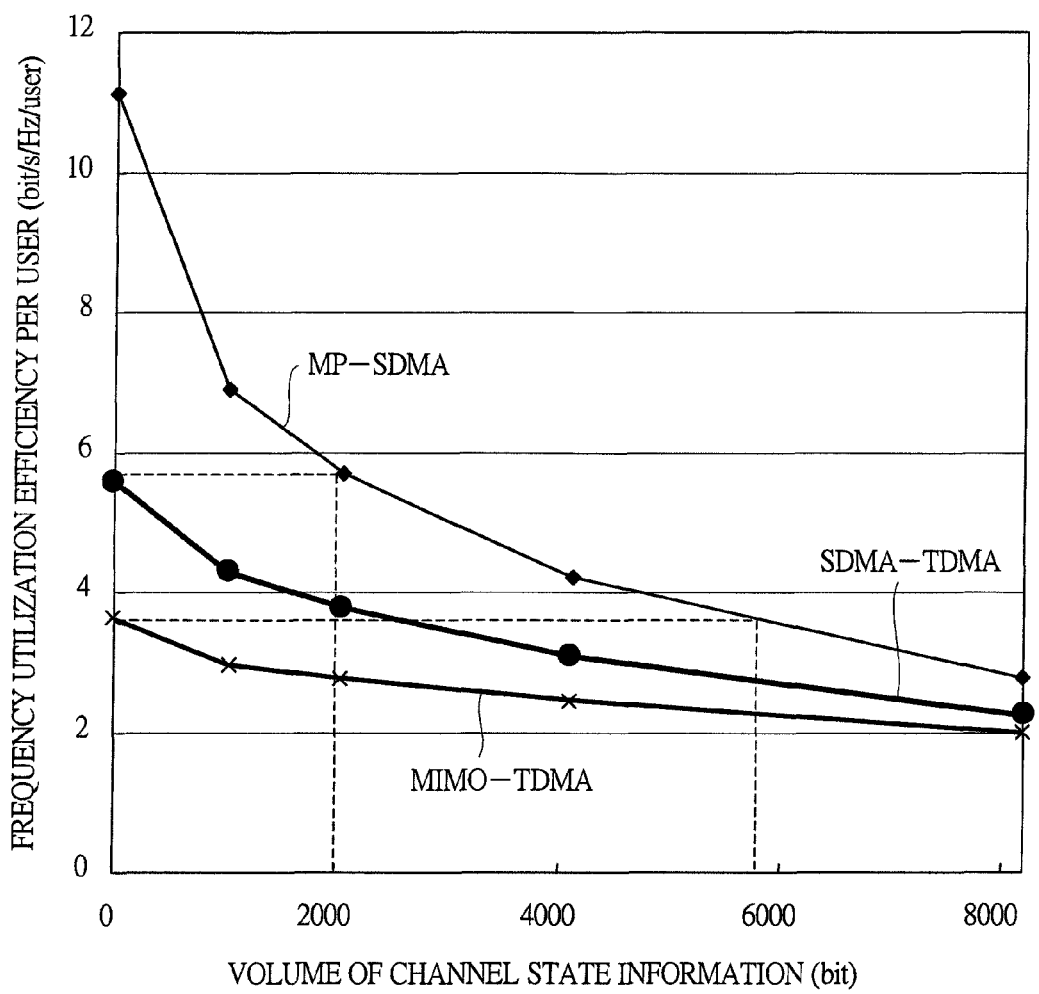

FIG. 9

| ANTENNA NUMBER | PREAMBLE SIGNAL | | | | INFORMATION THAT JUDGES WHETHER TO FEED BACK | | | |
|---|---|---|---|---|---|---|---|---|
| | FIRST SYMBOL | SECOND SYMBOL | THIRD SYMBOL | FOURTH SYMBOL | | | | |
| #1 | C | | | | C | C | C | C |
| #2 | | C | | | | | | |
| #3 | | | C | | | | | |
| #4 | | | | C | | | | |

| ANTENNA NUMBER | PREAMBLE SIGNAL | | | | INFORMATION THAT JUDGES WHETHER TO FEED BACK | | | |
|---|---|---|---|---|---|---|---|---|
| #1 | C | | | | | | | |
| #2 | | C | | | C | C | C | C |
| #3 | | | C | | | | | |
| #4 | | | | C | | | | |

WIRELESS COMMUNICATION SYSTEM AND WIRELESS COMMUNICATION METHOD

TECHNICAL FIELD

The present invention relates to a wireless communication system, and more particular, the present invention relates to a technique effectively applied to a method of transmitting/receiving data between a plurality of base stations having a plurality of transmitting/receiving antennas and a plurality of mobile stations associated with each base station.

BACKGROUND ART

As a technique relating to a wireless communication system, there are, for example, techniques described in Non-Patent Documents 1 to 5 and techniques described in Patent Documents 1 to 3.

In Non-Patent Document 1, for the communication capacity of a one-to-N point wireless communication (BC: Broadcast Channel) in which one point of a transmitting station is associated with N points of receiving stations, Dirty Paper Coding is disclosed as a system of setting an upper limit of the system capacity. Also, in Non-Patent Document 2, existence of a system for maximally providing the capacity is disclosed.

Non-Patent Document 3 discloses a concept of a system for improving a throughput of the entire system by apparently increasing a total number of antennas on the transmitting station end to execute the above-described Dirty Paper Coding with a plurality of transmitting stations coordinately associated with each other.

Non-Patent Document 4 discloses an eigenmode transmission system as a system of maximally providing the communication capacity obtained by wireless propagation channel in one-to-one point wireless communication (Point to Point) in which one point of a transmitting station is associated with one point of a receiving station.

Non-Patent Document 5 discloses a technique of estimating channel station information in a wireless area in a multiuser system having one point of a transmitting station and a plurality of points of receiving stations.

Patent Document 1 discloses a technique of simultaneous transmission by performing space division (SDMA: Space Division Multiple Access) for a plurality of mobile stations in a time slot of time division (TDMA: Time Division Multiple Access).

Patent Document 2 discloses a method of calculating a combination of antennas for developing an optimum performance among a plurality of transmitting/receiving antennas.

Patent Document 3 discloses a technique of increasing the communication capacity by adjusting a modulation system and a transmission bit rate such as a coding rate responding to the variation of SDMA environmental parameters.

PRIOR ART DOCUMENTS

Patent Documents

Patent Document 1: Japanese Patent Application Laid-Open Publication No. 2007-96727
Patent Document 2: Japanese Patent Application Laid-Open Publication No. 2008-092433
Patent Document 3: Japanese Patent Application Laid-Open Publication No. 2005-102136

Non-Patent Documents

Non-Patent Document 1: "Writing on dirty paper", IEEE Trans. Inform. Theory, vol. 29, issue 3, May 1983, Written by M. Costa, published by IEEE, p. 440, FIG. 1: Variation of Gaussian-Shannon channel
Non-Patent Document 2: W. Yu and J. M. Cioffi, "Sum capacity of Gaussian vector broadcast channels", IEEE Trans. Inform. Theory, Vol. 50, No. 9, pp. 1875-1892, September, 2004
Non-Patent Document 3: S. Shamai and B. Zaidel, "Enhancing the cellular downlink capacity via co-processing at the transmitting end", in Proceedings of IEEE Vehicular Tech. Conf., May 2001-Spring, pp. 1745-1749
Non-Patent Document 4: "Applications of Space Division Multiplexing and Those Performance in a MIMO Channel", the transactions of the Institute of Electronics, Information and Communication Engineers. B Vol. J-87_B, No. 9, September, 2004 published by the Institute of Electronics, Information and Communication Engineers, written by Takeo Ohgane, Toshihiko Nishimura, and Yasutaka Ogawa
Non-Patent Document 5: "An Improved User Selection Algorithm in Multiuser MIMO-BC (Broadcast) with Channel Prediction", IEICE Technical Report RCS2008-11 (2008-05), published by the Institute of Electronics, Information and Communication Engineers, written by Shi Min and Tomoaki Ohtsuki.

DISCLOSURE OF THE INVENTION

Problems to be Solved by the Invention

Incidentally, in a wireless communication system, as accompanied with a high-speed system in recent years, a MIMO (Multiple Input Multiple Output) technique of transmitting data from a plurality of antennas and receiving the same by a plurality of antennas has been adopted for many wireless standard such as wireless LAN and mobile communication from a viewpoint of improving frequency utilization efficiency.

For example, in one-to-one wireless communication (point to point) in which one point of a transmitting station is associated with one point of a receiving station, there is known an eigenmode transmission system disclosed in Non-Patent Document 4 as a system of maximally providing communication capacity obtained by a wireless propagation channel. In this eigenmode transmission system, the capacity obtained by the transmission channel is maximally provided as char-acteristics of the wireless propagation channel between the transmitting and receiving antennas by performing eigen decomposition (singular Value Decomposition) to a channel matrix "H" and calculating the matrix obtained by the eigen decomposition to be weighted as a transmitting vector signal and a receiving vector signal. However, since the channel state information measured at the receiving end is fed back to the transmitting end, an actual channel state in the communication is different from the fed-back channel state when the wireless propagation channel significantly varies, and therefore, there arises a problem that a communication performance is deteriorated. In a system presuming a semi-static environment that a user does not move so much such as a wireless LAN environment, the system is effective because of low variation in the wireless propagation channel.

Further, many studies have been made on communication capacities of a one-to-N wireless communication (BC) in which one point of a transmitting station is communicated with N points of receiving stations and an M-to-one wireless communication system (MAC: Multiple Access Channel) in which M points of transmitting stations are communicated with one point of a receiving station, from a viewpoint of information theory. In the communication capacity of the BC, the Dirty Paper Coding disclosed in Non-Patent Document 1 has been introduced as a system of providing an upper limit of the system capacity, and Non-Patent Document 2 establishes existence of a system for maximally providing the capacity.

In the one-to-N BC as compared with the above-described one-to-one eigenmode transmission system, a total number of antennas on the receiving end is increased as increase in the number of users, and therefore, the communication capacity which can be provided in the entire system is increased.

The techniques disclosed in these Non-Patent Documents are not established unless the channel state information formed in the space between the transmitting/receiving stations is instantaneously acquired on the transmitting end. In an actual system, the channel state information is measured on the receiving end, and is notified to the transmitting end with using a feedback link connected from the receiving end to the transmitting end. The channel varies during a delay time required for this feedback, and the deterioration of the performance becomes large, and therefore, it is difficult to achieve the techniques.

Further, in the one-to-N communication capacity of BC, the communication capacity which can be provided is limited due to the limitation of the number of antennas of the transmitting station. Accordingly, the above-described Non-Patent Document 3 discloses a concept of a system of improving a throughput of the entire system by apparently increasing a total number of antennas on a transmitting station end by coordinately associating a plurality of transmitting stations with each other to execute the above-described Dirty Paper Cording.

Still further, in a conventional wireless communication system, various methods are known such as a method of FDMA (Frequency Division Multiple Access) in which a frequency is divided from that of an adjacent base station when signals are simultaneously transmitted from the base stations to the mobile stations and reusing the frequency at separated locations away from each other by design of a cell structure, and a method of CDMA (Code Division Multiple Access) in which, even when a plurality of base stations transmit signals with the same frequency, the frequency is multiplexed by coding and the signals are fetched by the same coding on the receiving end. Still further, a method is also known such that time division (TDMA) is performed to a plurality of base stations. Still further, in recent years, as disclosed in the above-described Non-Patent Document 3, a system in which a plurality of base stations are associated with each other to communicate with a plurality of mobile stations by space division (SDMA) has been also proposed. These multiple access techniques are decided and operated based on a system standard.

For example, in the above-described Patent Document 1 in which simultaneous communications by SDMA are performed to a plurality of mobile stations in a time slot of TDMA, although a SDMA communication for a mobile station contained by one base station is disclosed, a system of improving a throughput in the entire system by performing the SDMA communication in which the plurality of base stations are coordinated with each other is not disclosed.

Further, in the method disclosed in the above-described Patent Document 2, a common code book is used between transmitting and receiving stations as the feedback information. However, when a difference between the channel state information represented by the code book and the measured channel state information is large, there arises a problem such as the deterioration of the communication performance. More particularly, in the case of performing the SDMA communication to the plurality of mobile stations by coordinating the plurality of base stations with each other, for the channel state information between the plurality of mobile stations and the plurality of base stations, geographical distribution occurs in the variation of the channel state information which is significantly varied in some mobile stations while slightly varied in some mobile stations as increasing the containing area. If the channel state information is represented by the code book so as to also include this geographical distribution, a type of the channel state information handled by the code book has to be consequently increased. It is necessary that there arises a difference in a structure between the code book for the channel state information required for the SDMA communication for only one base station and the code book required for the case of the coordination among the plurality of base stations. In such a system as switching to be the scalable communication mode in a scalable manner, a system which can reduce the feedback volume and correctly acquire the channel state information is required.

Further, in the technique disclosed in Patent Document 3, a degree of reliability is judged based on correlation between the original channel state information and the channel state information estimated, followed, and calculated on the receiver end. This technique is different from that of the present invention in which the degree of reliability is judged based on correlation between the received channel state information and the channel state information which has been reported. In addition, in Patent Document 3, with using this reliability, a modulation system and an error-correcting code are switched. However, the present invention is also different in a point that this reliability is used for switching a communication mode such that the SDMA itself is not used and is replaced with a MIMO-TDMA or others.

In the wireless communication system as described above, the system in which a plurality of base stations are coordinated with each other to communicate with a plurality of mobile stations by the SDMA has a possibility of increasing the capacity provided by the system. On the other hand, due to the increase of the number of mobile stations and the number of transmitting/receiving antennas simultaneously handled by the system, there arises a problem that a volume of the channel state information communicated between the transmitting/receiving stations is increased. In the increase of the volume of the channel state information, when the channel state information is precisely fed back from the receiving end to the transmitting end, a state of the channel is changed due to delay of the feedback to cause a difference between the channel at the time of communication and the channel acquired by the feedback, and therefore, the transmission rate provided by the system is deteriorated. Also, even in a case of no change of the state of the channel, when a volume of the feedback is large, there arises a problem that a substantial throughput is deteriorated due to communication protocol overhead.

Further, since the mobile station has various pieces of the channel state information such as stationary and moving one, the feedback needs to be performed at an appropriate timing in order to always keep the latest channel state information which is changed every moment sometimes. Further, when a traffic volume of the communication demanded by the mobile station is not large, the demand may be satisfied even without the coordination among the base stations by a conventional communication method of performing communication of a single base station with one or a plurality of mobile stations, and therefore, it is not necessary to always perform the SDMA communication by a plurality of base stations.

In consideration of these circumstances, a wireless communication system is required, in which a communication mode capable of providing resources necessary for exceeding a demand speed of the mobile station can be automatically decided and switched. Further, for the problem of the increase of the feedback volume when the communication mode is switched, a communication mode is required to provide a mode for reducing the feedback volume to prevent efficiency decrease of the frequency utilization efficiency. Accordingly, a preferred aim of the present invention is to provide a wireless communication system which exceeds a transmission rate demanded by a mobile station and reduces a feedback volume.

The above and other preferred aims and novel characteristics of the present invention will be apparent from the description of the present specification and the accompanying drawings.

Means for Solving the Problems

The summary of the typical ones of the inventions disclosed in the present application will be briefly described as follows.

That is, as the summary of the typical ones, in a wireless communication system including: a plurality of base stations having a plurality of antennas; a plurality of mobile stations having a plurality of antennas; and a base station controller of collectively controlling the plurality of base stations. The wireless communication system includes, during certain constant time (time slot): a communication mode (called "MIMO+TDMA communication mode") by which only one base station and one mobile station are communicated with each other; a communication mode (called "SDMA+TDMA communication mode") by which one base station and a plurality of mobile stations are simultaneously communicated with each other; and a communication mode (called "multipoint SDMA communication mode") by which a plurality of base stations and a plurality of mobile stations are simultaneously communicated with each other by coordinating the plurality of base stations with each other by the base station controller, and an appropriate communication mode is automatically decided by switching the communication modes based on judgment whether or not a communication speed demanded by the mobile station is exceeded, by the base station and/or base station controller.

For the judgment whether or not the demand transmission speed is exceeded, channel state information between the antenna of the base station and the antenna of the mobile station is collected, a communication capacity which can be provided in each communication mode is calculated from the collected channel state information, and it is judged whether or not the demand transmission speed is exceeded by a degree of the communication capacity.

In a method of collecting the channel state information between the antenna of the base station and the antenna of the mobile station by the base station or the base station controller, the base station includes: means for transmitting a preamble signal with an already-known pattern necessary for measuring the channel state information at the mobile station; and means for notifying information relating to a feedback method of deciding how the mobile station feeds back the channel state information. In the method, the mobile station measures the channel state information by the preamble signal, it is judged whether or not the measured channel state information is fed back or others in accordance with the information relating to the feedback method, and the channel state information is fed back based on a judgment result, so that a feedback volume of the channel state information is reduced.

More specifically, since the channel state information which the base station uses is based on the channel state information having already been fed back and notified to the base station in past by the mobile station, correlation between the channel state information used in present by the base station and the latest channel state information measured from the preamble signal by the mobile station is acquired. When the correlation is high, the feedback volume is reduced by feeding back only the information that the past channel state information can be used as it is. Alternatively, an actual error rate of the communication data or others is measured, and if the error rate is within an allowable range, it is judged that the channel state information used by the base station which is notified in the past can be continuously used, and only the information that the channel state information can be used is fed back.

Effects of the Invention

The effect obtained by typical aspects of the present invention will be briefly described below.

That is, as the effect obtained by typical aspects, a wireless communication system capable of exceeding a communication speed demanded by a mobile station and reducing a feedback volume can be provided.

BRIEF DESCRIPTIONS OF THE DRAWINGS

FIG. 4 is a diagram illustrating an example of a control sequence in a multipoint SDMA communication mode according to the embodiment of the present invention;

FIG. 5 is a diagram illustrating an example of relationship between processing and frame in a case of mixing a plurality of communication modes, according to the embodiment of the present invention;

FIG. 6 is a diagram illustrating an example of relationship between transmission power and frequency utilization efficiency per user in each communication mode, according to the embodiment of the present invention;

FIG. 7 is a diagram illustrating an example of channel state information according to the embodiment of the present invention;

FIG. 8 is a diagram illustrating an example of relationship between a feedback volume of channel state information and characteristics of the frequency utilization efficiency per user in each communication mode, according to the embodiment of the present invention;

FIG. 9 is a diagram illustrating an example of an enhanced preamble signal according to the embodiment of the present invention;

Figure 17:
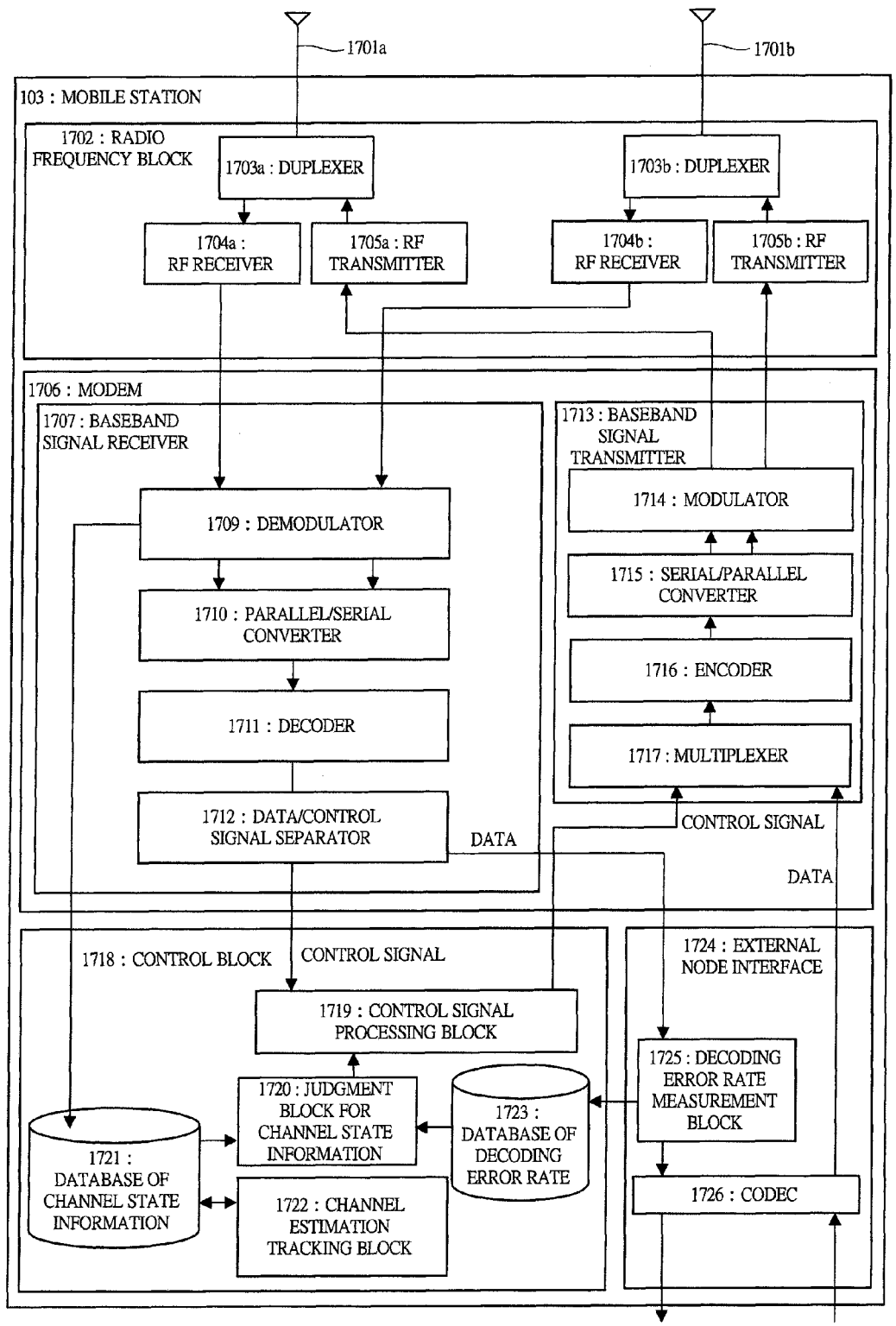
Figure 18:
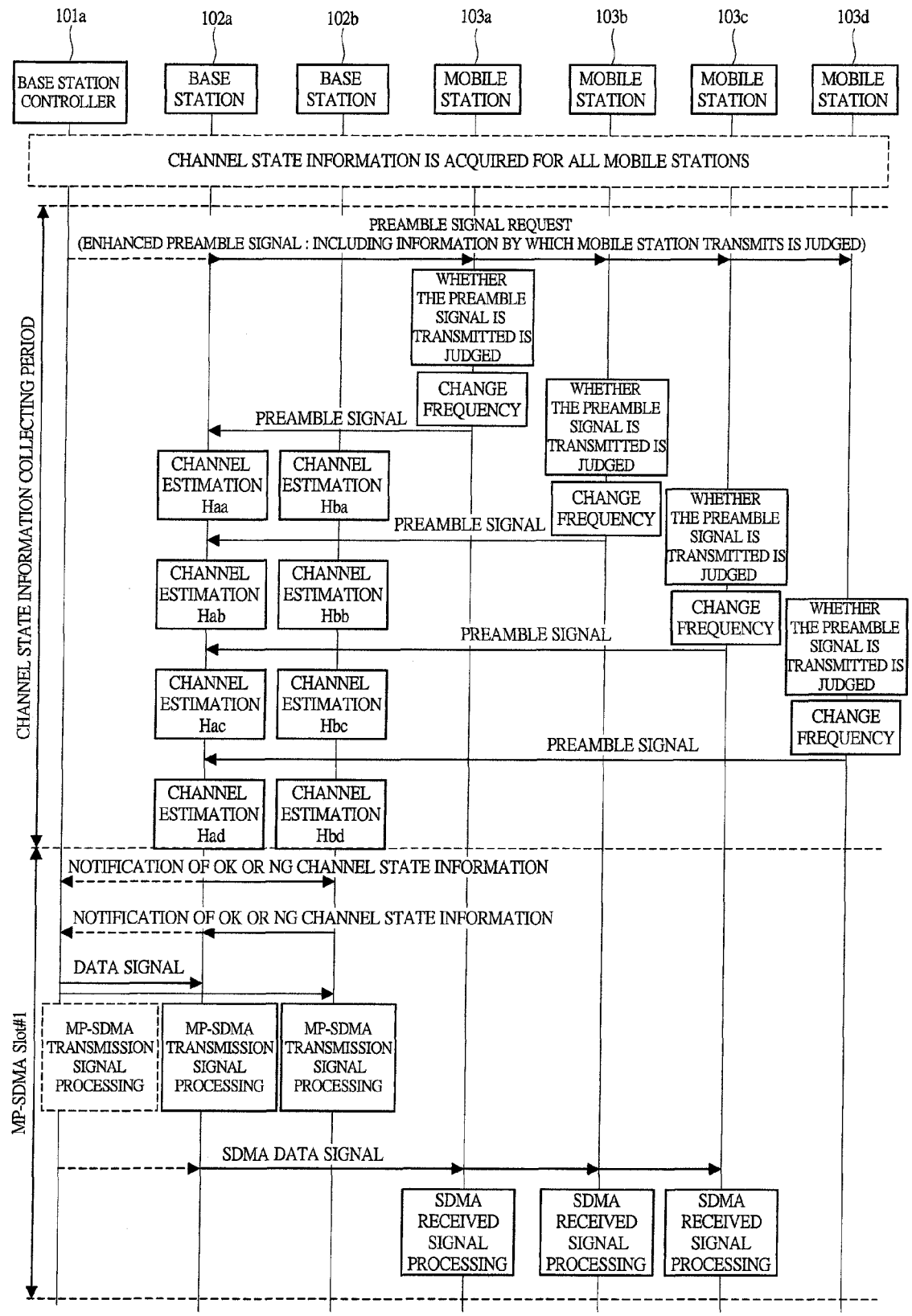
Figure 19:
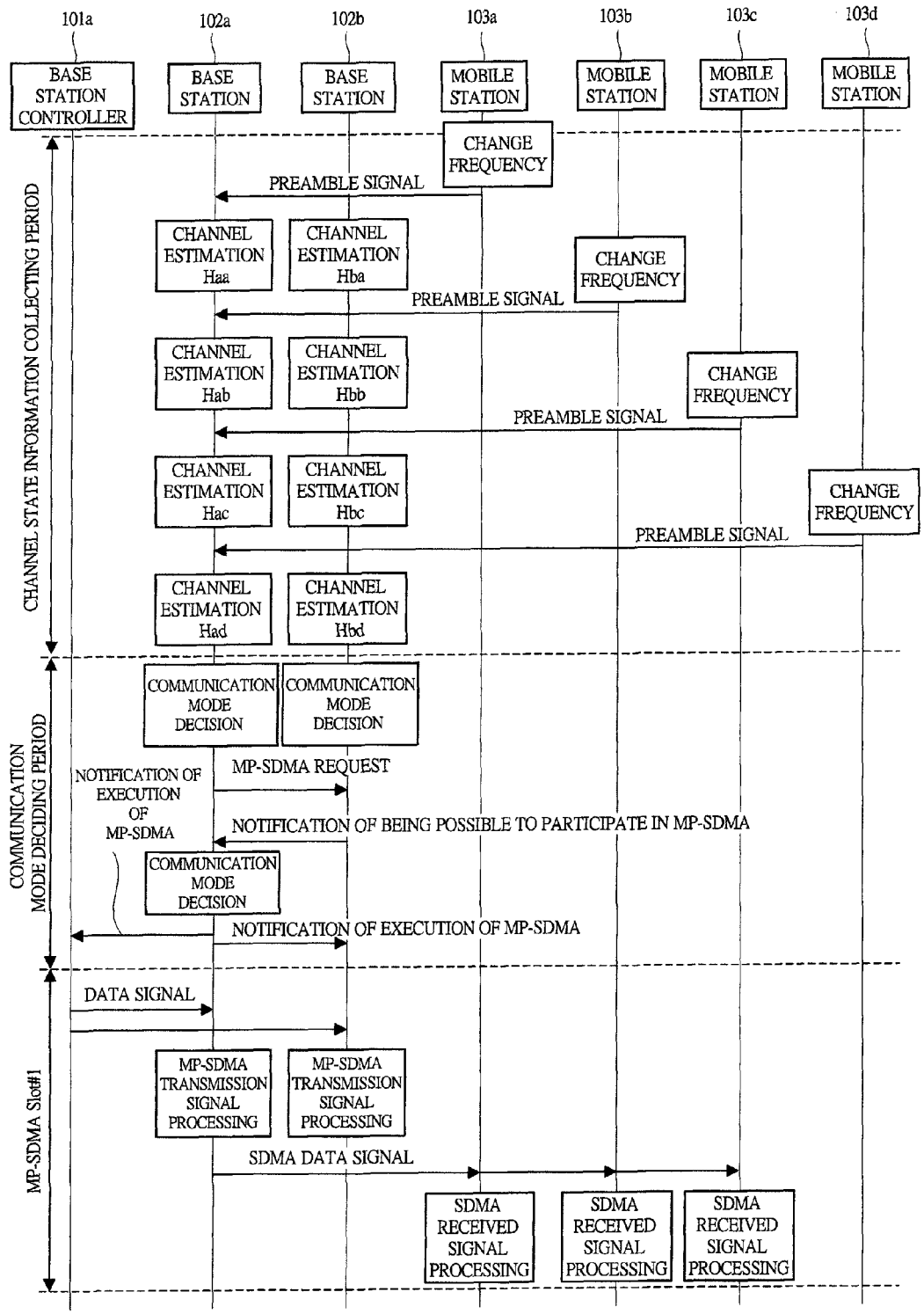

FIG. 17 is a diagram illustrating an example of a structure of a mobile station according to the embodiment of the present FIG. 18 is a diagram illustrating an example (example that the base station measures the channel state information with a signal transmitted from the mobile station) of a control sequence according to another embodiment of the present invention; and FIG. 19 is a diagram illustrating an example of a control sequence in a case that the base station autonomously decides the multipoint SDMA communication, according to another embodiment of the present invention.

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
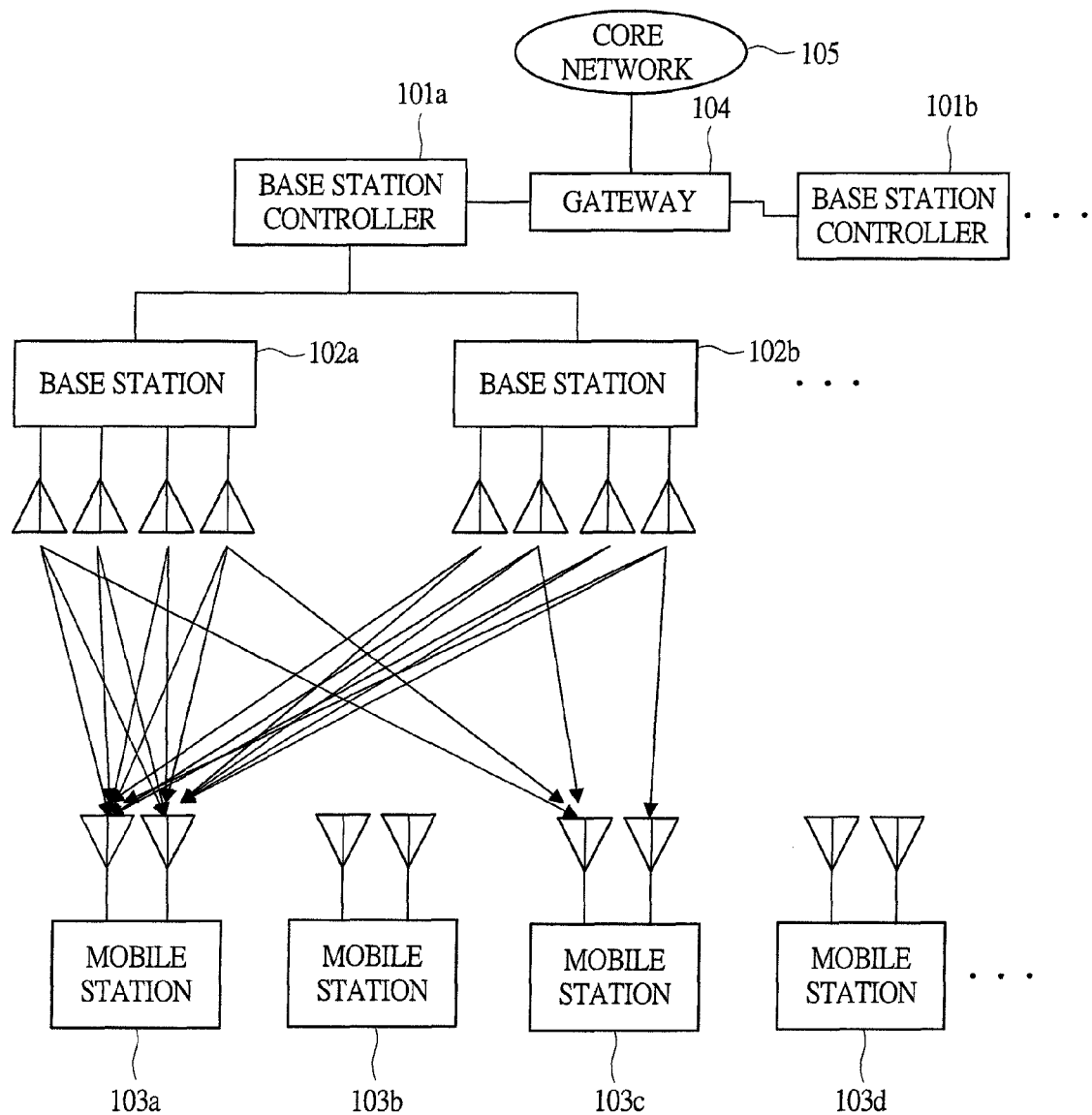
FIG. 1 is a diagram illustrating an example of the entire structure of a wireless communication system according to an embodiment of the present invention.

FIG. 1 illustrates an example of the entire structure of a wireless communication system according to an embodiment of the present invention. The wireless communication system includes: a base station controller 101a; a plurality of base stations 102a, 102b . . . connected to the base station controller 101a; a plurality of mobile stations 103a, 103b, 103c, 103d . . . transmitting/receiving data to/from these base stations 102a, 102b . . . ; and others. Each of the base stations 102a, 102b . . . has a plurality (for example here, four) of antennas. Further, each of the mobile stations 103a, 103b, 103c, 103d . . . has a plurality (for example here, two) of antennas.

Note that, in this wireless communication system, the base station controller 101a is connected to a gateway 104, and further, this gateway 104 is connected to the base station controller 101b. Signals among a plurality of base station controllers are transferred via the gateway 104. Further, the gateway provides means for access to a core network 105. The core network 105 is connected to Internet.

The base station controller 101a controls the base stations 102a, 102b . . . under its control to achieve to control the collaborative-coordination among the base stations. The example of FIG. 1 illustrates a state in which the base stations 102a and 102b control the collaborative-coordination for SDMA communication at certain moment to transmit data to the mobile stations 103a and 103c. The mobile stations 103a and 103c perform the received signal processing by separating a desired signal. At this time, the base station controller 101a forms a transmitting signal for the SDMA, acquires the channel state information for total four receiving antennas of the mobile stations 103a and 103c with using total eight transmitting antennas of the base stations 102a and 102b, and performs the received signal processing for the broadcast channels of 8×4.

Further, the base station controller 101a can be connected to the other base station controller 101b via the gateway 104, and they mutually exchange information of the controlled base stations, so that interference with each other can be prevented by allocating a different frequency thereto, and the base stations under control of each base station controller can be coordinately controlled by collaborative-coordination between the base station controllers depending on cases. By coordinately controlling among the base stations, the number of transmitting antennas is increased, so that the throughput of the entire system can be improved.

Figure 2:
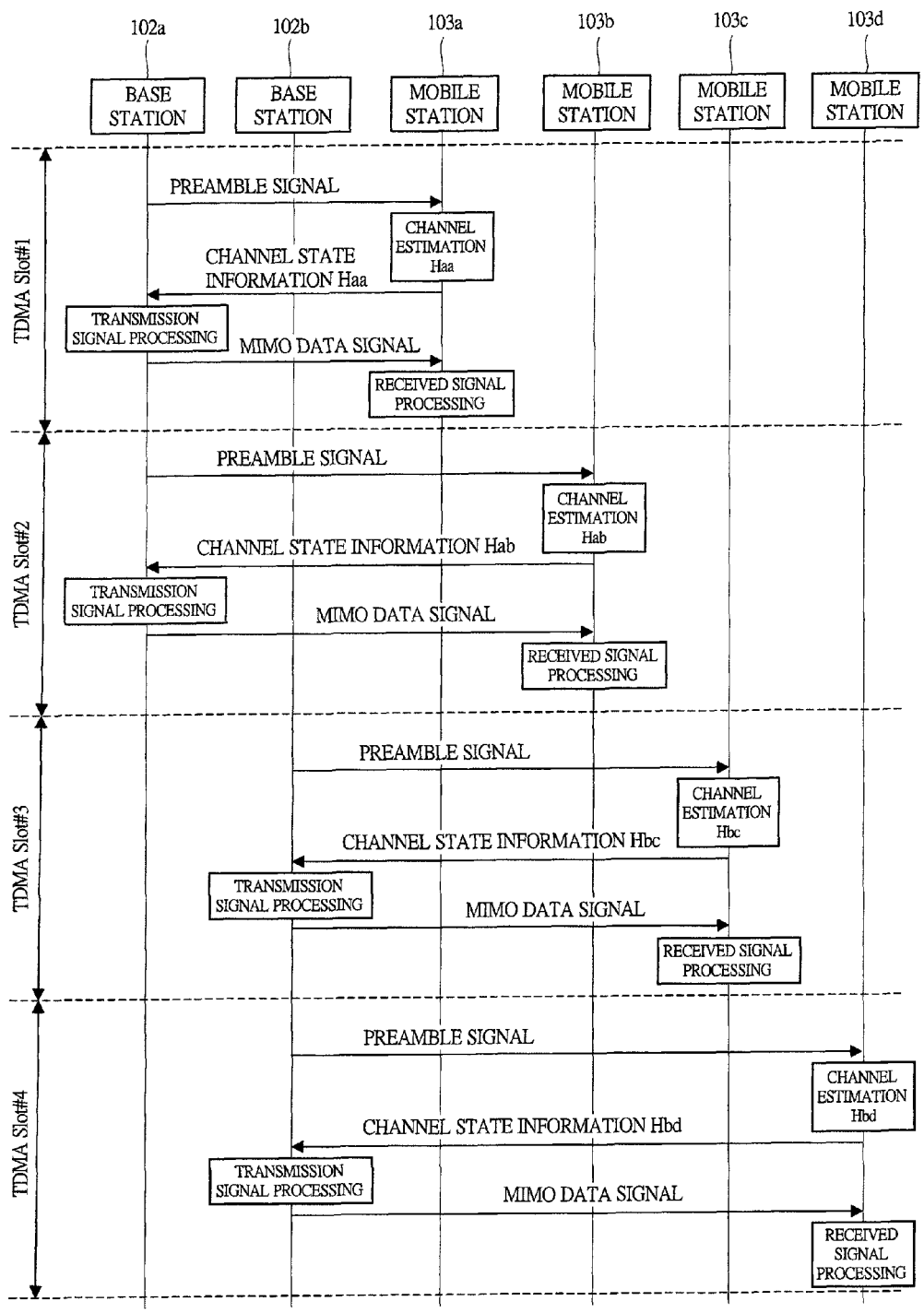
FIG. 2 is a diagram illustrating an example of a control sequence in a MIMO+TDMA communication mode according to the embodiment of the present invention.

FIG. 2 illustrates an example of a control sequence in a MIMO+TDMA (referred to also as MIMO-TDMA) communication mode in which communication between the base station and the mobile station is time-divided so as to be in one-to-one correspondence with each other at a moment.

First, the base station 102a transmits a preamble signal for acquiring the channel state information in a TDMA time slot (Slot) #1. It is assumed that the mobile station 103a previously acquires a right to communicate in the time slot #1 based on a communication protocol. The mobile station 103a receives the preamble signal and performs channel estimation. The mobile station 103a feeds back the acquired channel state information "Haa" to the base station 102a. Here, the channel state information notified from the mobile station to the base station may be the channel estimation information acquired by receiving the preamble signal at the moment or the averaged channel state information acquired by receiving the preamble signal several times. Also, when the preamble signal has not been received in the time slot, the channel state information acquired when received in the previous time slot may be used.

Subsequently, the base station 102a generates a MIMO data signal for MIMO communication by transmission signal processing with using the fed-back channel state information Haa, and transmits this MIMO data signal. The mobile station 103a receives the MIMO data signal, and performs the received signal processing of separating the signal multiplexed for a plurality of antennas. As this MIMO communication, for example, an eigenmode transmission system can be cited.

The communication is performed by a procedure that the base station 102a communicates (with using channel state information "Hab") with the mobile station 103b in a next time slot #2 by the same procedure as described above, the base station 102b communicates (with using channel state information "Hbc") with the mobile station 103c in a next time slot #3, and further, the base station 102b communicates (with using channel state information "Hbd") with the mobile station 103d in the a time slot #4. In this communication mode, it is assumed that a schedule about which base station communicates with which mobile station at what time is previously made based on a communication protocol.

Figure 3:
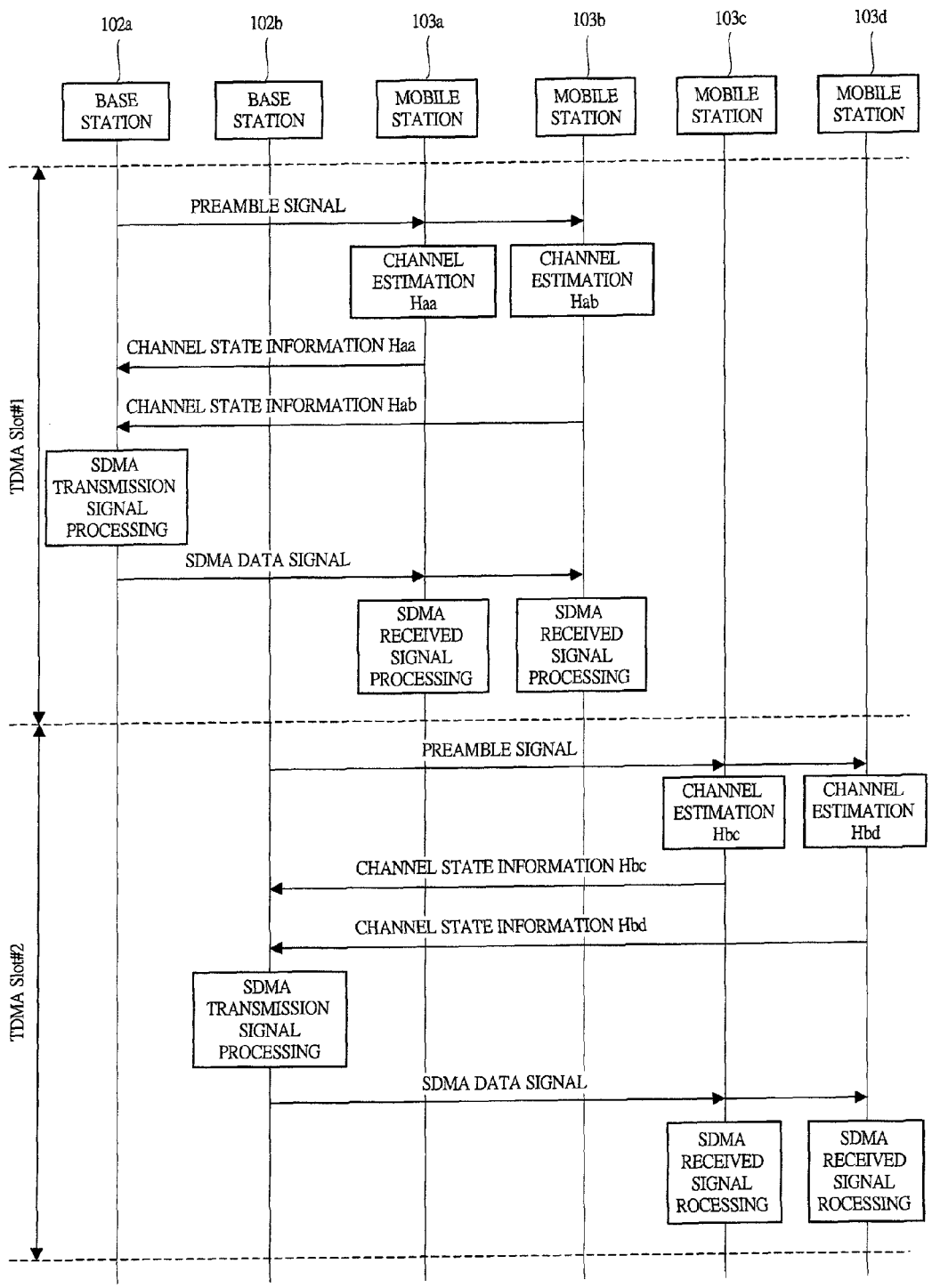
FIG. 3 is a diagram illustrating an example of a control sequence in an SDMA+TDMA communication mode according to the embodiment of the present invention.

FIG. 3 illustrates an example of a control sequence in a SDMA+TDMA (referred to also as SDMA-TDMA) communication mode in which a single base station performs SDMA communication with a plurality of mobile stations, and the transmission time between the base stations is time-divided. It is assumed that the time slot #1 is previously allotted for the base station 102a based on a communication protocol. In addition, it is assumed that the mobile stations 103a and 103b are dependent on (associated with) the base station 102a based on a communication protocol.

In the TDMA time slot #1, the base station 102a transmits a preamble signal, and the mobile stations 103a and 103b receiving this preamble signal estimate the channel state information "Haa" and "Hab" and feed back the result to the base station 102a as channel state information. As described above with reference to FIG. 2, the channel state information may be the averaged channel state information or the channel state information estimated by receiving the previous preamble signal.

The base station 102a generates a SDMA data signal by SDMA transmission signal processing as disclosed in, for example, the above-described Non-Patent Document 2 with using the acquired channel state information Haa and Hab, and transmits this SDMA data signal. The mobile stations 103a and 103b fetches a desired signal by performing the SDMA received signal processing as disclosed in, for example, the above-described Non-Patent Document 2.

In a next time slot #2, the base station 102b communicates (with using channel state information "Hbc" and "Hbd") with the mobile stations 103c and 103d by the same procedure as described above.

FIG. 4 illustrates an example of a control sequence in a multipoint SDMA (referred to also as MP-SDMA) communication mode in which a plurality of base stations are coordinated with each other to perform SDMA communication with a plurality of mobile stations.

In a TDMA time slot #1, the base station controller 101a generates a preamble signal, and transmits the preamble signal with using antennas of the base stations 102a and 102b. Alternatively, each of the base stations 102a and 102b may generate a preamble signal, and transmission time by the base station 102a and transmission time by the base station 102b may be previously decided based on a communication protocol. The mobile stations 103a, 103b, 103c, and 103d receive this preamble signal, and estimate the channel state information Haa, Hab, Hac, Had, Hba, Hbb, Hbc, and Hbd. Each mobile station notifies the acquired channel state information to the base station controller 101a. As described above with reference to FIG. 2, the channel state information may be the averaged channel state information or the channel state information estimated by receiving the previous preamble signal. For example, since the mobile station 103a is associated with the base station 102a, the mobile station 103a cannot receive the preamble signal transmitted from the base station 102b, and therefore, may not acquire the channel state information. In this case, no channel state information may exist, the previous channel state information may be used, or the averaged channel state information may be transmitted.

The base station controller 101a generates the SDMA data signal by the SDMA transmission signal processing (as disclosed in, for example, the above-described Non-Patent Document 2) based on the acquired channel state information Haa+Hba, Hab+Hbb, Hac+Hbc, and Had+Hbd, and simultaneously transmits the data to the mobile stations 103a, 103b, 103c, and 103d via the base stations 102a and 102b. Each mobile station fetches a desired signal by performing the SDMA received signal processing (as disclosed in, for example, the above-described Non-Patent Document 2).

FIG. 5 illustrates an example of the processing in a case of mixing a plurality of communication modes such as the MIMO-TDMA, the SDMA-TDMA, and the multipoint SDMA descried above. In addition, FIG. 5 also illustrates a relationship with a frame.

Although each communication mode is mixed within one frame, it is judged whether or not the communication should be performed as follows (0: does not communicate and 1: communicates) in each communication mode (MIMO-TDMA (or SIMO: Single Input Multiple Output), SDMA-TDMA, and MP-SDMA). Note that the frame time is previously fixedly decided so as to exceed a demand delay time of an application for the mobile station. Alternatively, the frame time may be dynamically decided so as to exceed a minimum value of a delay time demanded by the application for the mobile station.

With using the channel state information utilized in the previous frame and/or a statistical value of the channel state information, a structure of a communication mode in a next frame is judged on an assumption that such same channel state information can be acquired in the next frame.

For example, a transmission rate acquired when a mobile station "k" performs the MIMO-TDMA communication with using the entire frame is expresses by "Cmimo_k", and a demand speed of the mobile station is expressed by "R_k". When a following formula (1) is satisfied for all of the mobile stations k, only the MIMO-TDMA communication is performed over the entire frame.

$$Cmimo\_k \geq R\_k \quad \text{Formula (1)}$$

Here, when a transmission rate acquired when the SIMO communication with using one transmitting antenna and N receiving antennas is performed by fixing one antenna on the transmitting end, selecting one antenna at random, or selecting one antenna having the largest stream of an eigen value is expressed by "Csimo_k", even if the MIMO signal processing is not performed for the mobile station k satisfying a following formula (2), the SIMO communication may be performed in a provided time slot.

$$Csimo\_k \geq R\_k \quad \text{Formula (2)}$$

If a mobile station not satisfying the above-described formula (1) exists, when a transmission rate acquired when the SDMA-TDMA communication is performed with using the entire frame is expressed by "Csdma_k" and when a following formula (3) is satisfied, only the SDMA-TDMA communication is performed over that entire frame.

$$Csdma\_k \geq R\_k \quad \text{Formula (3)}$$

If the formula (3) is not satisfied, when a ratio of time for the SDMA-TDMA communication with respect to 1 representing time for the entire frame is expressed by "α" and a following formula (4) is satisfied for all of the mobile stations k, the MIMO-TDMA communication and the SDMA-TDMA communication are time-divided by the time ratio α to be operated within the frame.

$$(1-\alpha) \times Cmimo\_k + \alpha \times Csdma\_k \geq R\_k \quad \text{Formula (4)}$$

If the formula (4) is not satisfied, when a transmission rate acquired when the MP-SDMA communication is performed with using the entire frame is expressed by "Cmpsdma_k" and when a following formula (5) is satisfied, only the MP-SDMA communication is performed over that entire frame.

$$Cmpsdma\_k \geq R\_k \quad \text{Formula (5)}$$

If the formula (5) is not satisfied, when ratios of time for the SDMA-TDMA communication and for the MP-SDMA communication with respect to 1 representing time for the entire frame are expressed by "α" and "β", respectively, α and β satisfying a following formula (6) are searched by linear programming or others. If a satisfying solution exists, the communications are operated by respective time ratios.

$$(1-\alpha-\beta) \times Cmimo\_k + \alpha \times Csdma\_k + \beta \times Cmpsdma\_k \geq R\_k \quad \text{Formula (6)}$$

In this manner, by deciding the SDMA-TDMA communication and MP-SDMA communication based on the MIMO-TDMA communication, the MIMO-TDMA communication or the SIMO-TDMA communication is performed when the demand transmission rate is small. This is because a size of the channel state information required for each communication mode becomes larger in order of the SIMO-TDMA communication, the MIMO-TDMA communication, the SDMA-TDMA communication, and the MP-SDMA communication, and therefore, the operation so as to reduce the volume of feedback information as less as possible if not required can be achieved.

However, when the demand transmission rate satisfies a case such as a best-effort system, a demand transmission rate "Rk" is set to be a theoretical limitation in using all of the transmitting/receiving antennas, and time ratio may be acquired so as to minimize the "(left-hand side)-(right-hand side)" of the formula (5).

FIG. 6 illustrates, in a case of no overhead of the feedback of the channel state information, an example of a relationship between transmission power (Power) and frequency utilization efficiency per user of each communication mode. As the transmission power, total transmission power of all the transmitting antennas with respect to the power of thermal noise on each antenna is illustrated in decibel. As a channel model, i.i.d Rayleigh channel model is assumed, which is an example calculated so as to have two base stations having four antennas and four mobile stations having two antennas as illustrated in FIG. 1. Note that the transmitting power in the MP-SDMA is a total transmitting power in two base stations. In this manner, the frequency utilization efficiency becomes higher in order of the MIMO-TDMA, the SDMA-TDMA, and the MP-SDMA, and the processing is satisfied by the MIMO-TDMA if the demand speed is slow as described above. However, it is found that processing such as the SDMA-TDMA or the MP-SDMA is required as the demand speed is higher.

FIG. 7 illustrates an example of the channel state information. The example shows the uncompressed channel state information in IEEE 802.11n standard of the wireless LAN. When the number of receiving antennas is two, an SNR (signal-to-noise ratio) of each antenna is expressed by 8 bits first. Subsequently, the channel state information (H11) for each subcarrier of OFDM (orthogonal frequency division multiplexing) signals is shown. The first information "3 bits" represents an amplitude gain applied over the whole channel. In the receiving, 8 bits are allocated to each of a real part and an imaginary part of a complex number in a matrix composed of a total number (Ntx) of the transmitting antennas×the number (2) of the receiving antenna in the received preamble signal. This channel matrix is provided by the number of subcarriers (f1 to f_L). In such channel state information, as the number of transmitting antennas increases, the size of the channel state information increases.

When the example illustrated in FIG. 1 is used, while the number of transmitting antennas is four in the MIMO-TDMA or SDMA-TDMA communication modes, the number of transmitting antennas is eight in the MP-SDMA communication mode to increase twice the size of the channel state information. Although there is a method for compressing this channel state information even in IEEE 802.11n standard, an error occurs on the channel state information to be fed back by the compression. Further, in a standard of the cellular communication system such as WiMAX (worldwide interoperability for microwave access) and LTE (long term evolution), there is a method for returning the channel state information to the transmitting end by previously sharing the channel state information at the transmitting end and the receiving end with using a code book and judging which one of the channel state information acquired at the receiving end is closest. Also in this case, the deterioration of the channel state information occurs.

FIG. 8 illustrates an example of characteristics between the feedback volume of the channel state information and the frequency utilization efficiency per user in each communication mode. Even when the same volume of the channel state information is fed back from each mobile station, the channel state information only for one mobile station is collected in the MIMO-TDMA, one base station collects the channel state information for two mobile stations in the SDMA-TDMA, and the channel state information for four mobile stations is collected in the MP-SDMA, and therefore, the overhead for collecting the channel state information for one communication is increased. In addition, in the MP-SDMA, the channel state information is also transmitted from the adjacent base station, and beside, the channel state information is large. Therefore, time in which communication can be effectively performed becomes short, and thus, a degree of deterioration of the frequency utilization efficiency increases as the volume of the channel state information increases.

FIG. 9 illustrates an example of an enhanced preamble signal according to the embodiment of the present invention. In FIGS. 2 to 4, the preamble signal for acquiring the channel state information by the mobile station is illustrated. However, by replacing this signal with the enhanced preamble signal illustrated in FIG. 9, a case of not requiring returning the measurement result of the channel state information itself can be provided. Similarly to the example of the conventional preamble signal, by a scattered-type method, a preamble signal with a fixed pattern is transmitted by changing an antenna for every symbol. The signal may be transmitted by a space-time coding type method of simultaneously transmitting the signal from each antenna.

Subsequently, feedback judgment information, which is necessary for deciding whether or not the mobile station feeds back the channel state information, is transmitted. First, the feedback judgment information is transmitted from an antenna #1, and the received signal processing is performed on the receiving end by a conventional method without performing the signal processing for the MIMO or the SDMA. In a next frame, a state in which the feedback judgment information is transmitted with using an antenna #2 is illustrated. In this example, the signal processing for the MIMO or the SDMA is not performed on the receiving end. However, when the signal processing for the MIMO or the SDMA is performed in the previous frame, the feedback judgment information may be transmitted with using all the antennas by using the signal processing in the previous frame.

Figure 10:
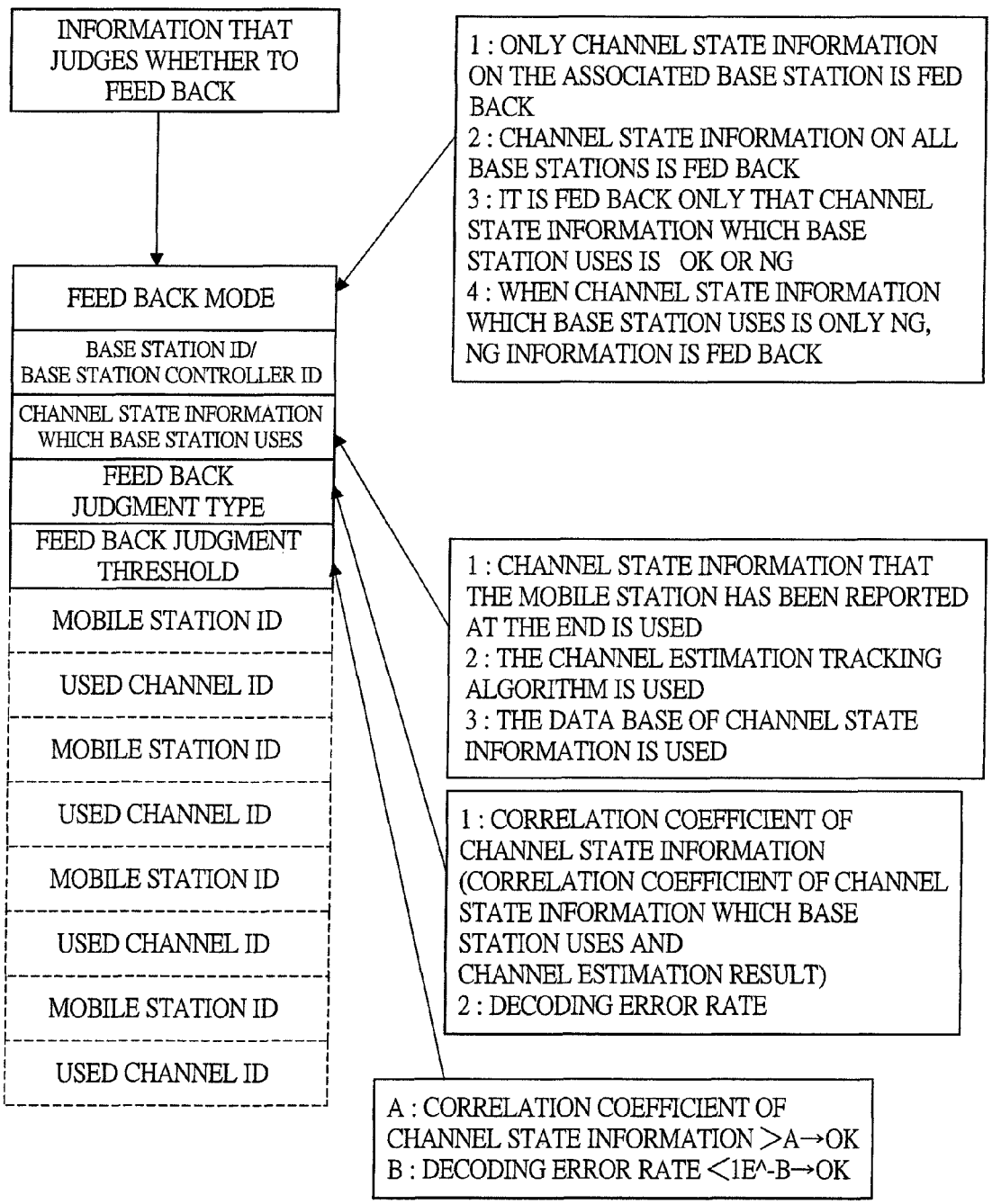
FIG. 10 is a diagram illustrating an example of a format of feedback judgment information according to the embodiment of the present invention.

FIG. 10 illustrates an example of a format of the feedback judgment information. In addition, FIG. 10 illustrates an example of information contents. The format of the feedback judgment information includes fields such as a feedback mode, a base station ID/base station controller ID, channel state information which a base station uses, a feedback judgment type, a feedback judgment threshold, a mobile station ID, and a used channel ID.

The feedback mode is a field which specifies how the mobile station having received the preamble signal feeds back the channel state information. For example, if 1 is specified in the field, only the channel state information transmitted from the transmitting antenna of the base station on which the mobile station is associated is fed back. This specification is used in the MIMO-TDMA or SDMA-TDMA communication mode. If 2 is specified in the field, preamble signals transmitted from all the base stations from which the mobile station can receive are received, and their channel state information are fed back. In this manner, the multipoint MIMO can be processed.

If 3 is specified in the field, the channel state information is judged as OK or NG depending on whether or not conditions described in the fields of the feedback judgment type and the feedback judgment threshold are satisfied, and 1 bit information for OK or NG is fed back. If 4 is specified in the field, although the same as the specification of 3, 1 bit information for NG of the channel state information is fed back only when NG of the channel state information exists. If there is no problem for the channel state information due to specifying 3 or 4, the volume of feedback information can be significantly reduced.

If 1 is set in the feedback judgment type, with using a channel correlation coefficient as a judgment reference, the channel information is judged by a correlation coefficient between the channel state information which the base station uses and a channel estimation result obtained by estimating a channel which the base station uses based on the channel state information acquired in receiving of the preamble signal. A specific value of the judgment is described in the feedback judgment threshold. For example, the channel state information is judged as OK if the correlation coefficient is larger than "A=0.9", and the channel state information is judged as NG if the correlation coefficient is equal to or smaller than "A=0.9". In the feedback judgment type, not only the channel correction coefficient but also, for example, an error rate (2 is set) of a decoding result is used, and the channel state information may be judged as NG if the decoding error rate is expressed by "BER>10^-3" when the feedback judgment threshold is expressed by "B=3", and the channel state information may be judged as OK in other cases.

In addition, for the feedback judgment type, a received signal strength indication (RSSI) of the preamble signal or the data signal, the Doppler frequency, a mobile speed of the mobile station, or others may be used. That is, if under an environment such that the received power is low or the channel state information widely varies due to high speed movement, it is judged that usage of the content is not appropriate for the MIMO or the SDMA, and in this case, the feedback volume of the channel state information can be automatically reduced.

When the channel correlation coefficient is specified for the feedback judgment type, how to acquire the channel state information which the base station uses is to read from the field of the channel state information which the base station uses. If 1 is specified in the field, it is simply considered that the base station uses the channel state information that the mobile station has reported to the base station at the end. If 2 is specified in the field, as assuming that estimation tracking processing is performed on the base station end for a receiving channel of the mobile station with using a method disclosed in Non-Patent Document 5 or others, it is considered that the base station uses a result obtained by the channel estimation tracking processing with using the same algorism on the mobile station end.

If 3 is specified in the field, as assuming that, for example, both of the base station and the mobile station have the same channel database, the channel state information which the base station uses can be known by notifying an index of the channel which the base station uses as an ID. In this case, since the ID is different depending on which channel is used in each mobile station, a set of the mobile station ID and the used channel ID is provided as a field. Further, the channel database which is the same in the base station and the mobile station may be previously calculated such as the above-described code book, or the database of the channel state information may be prepared in both the base station and the mobile station by adding a protocol by which the base station provides an ID to the channel state information has been reported by the mobile station.

Figure 11:
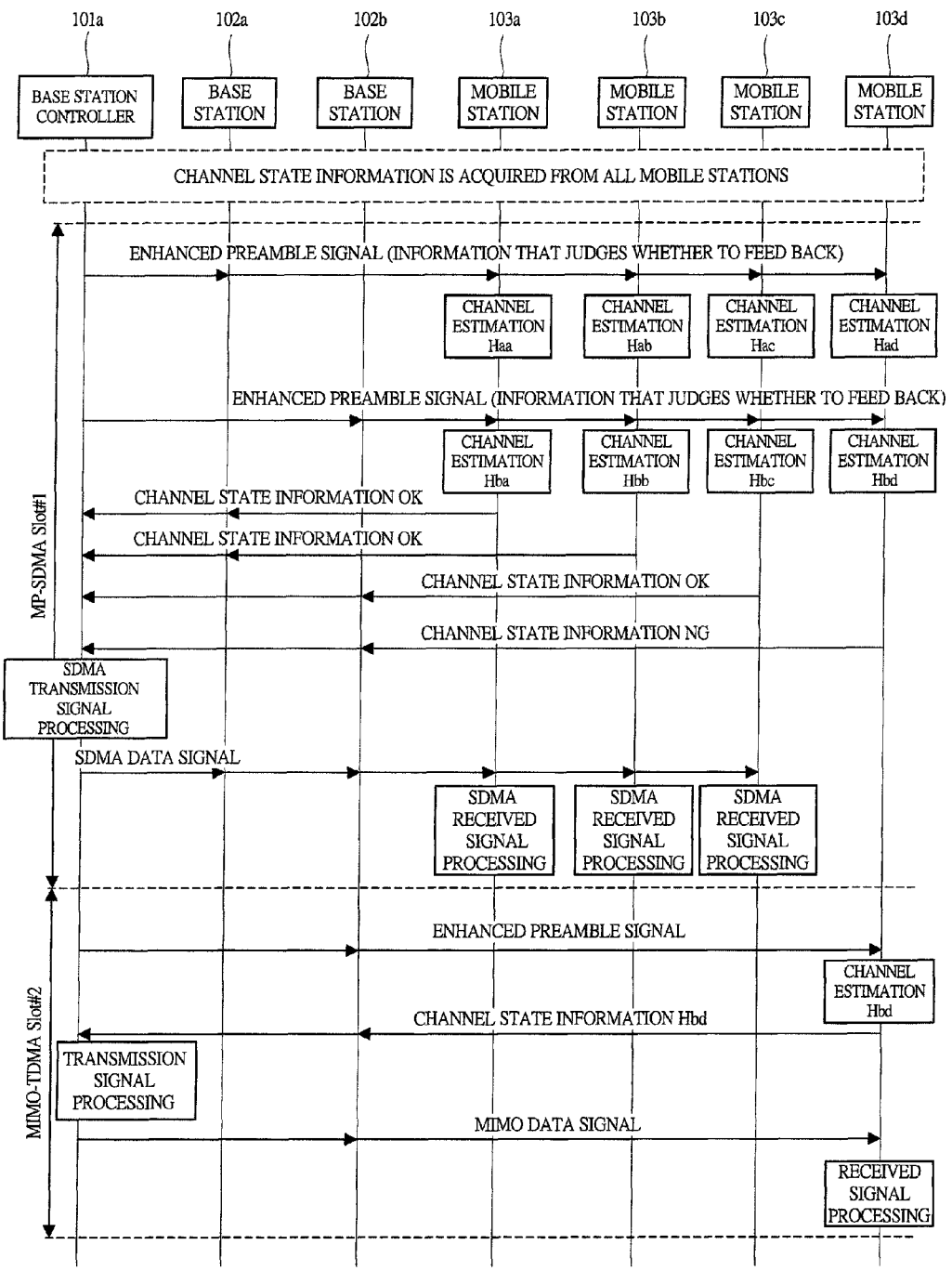
FIG. 11 is a diagram illustrating an example (in mixing of multipoint SDMA and MIMO-TDMA) of a control sequence according to the embodiment of the present invention.

FIG. 11 illustrates an example (mix of the multipoint SDMA and the MIMO-TDMA) of a control sequence according to the embodiment of the present invention. The example shows a state that acquirement of the channel state information of all the mobile stations in the previous frame has been already started and the MP-SDMA communication is performed.

In the MP-SDMA time slot #1, the base station controller 101a first transmits an enhanced preamble signal with a content for judging whether or not the channel state information is fed back via the base station 102a, and each of the mobile stations 103a, 103b, 103c, and 103d stores the channel state information Haa, Hab, Hac, and Had by the channel estimation processing. Next, similarly, the enhanced preamble signal is transmitted via the base station 102b, and the channel state information Hba, Hbb, Hbc, and Hbd are measured and stored by each of the mobile stations 103a, 103b, 103c, and 103d. Based on these pieces of the channel state information, each of the mobile stations 103a, 103b, 103c, and 103d notifies the base station controller 101a whether or not the channel state information which the base station uses is OK or NG to be used as described with reference to FIG. 10. For example, it is assumed that the channel state information is NG in only the mobile station 103d. The base station controller 101a acknowledges that the channel state information cannot be used for the mobile station 103d, and generates the SDMA data signal and transmits it to the rest of the mobile stations 103a, 103b, and 103c.

The demand speed cannot be exceeded in the terminal station 103d without any action, and therefore, the enhanced preamble signal is transmitted in a next time slot #2, and the channel state information Hbd which is a result measured by the mobile station 103d is notified to the base station controller 101a. At this time, the MIMO data signal is transmitted by the signal processing based on the MIMO-TDMA, and is received by the mobile station 103d.

In a next frame, it is heard with using the channel state information updated from the mobile station 103d whether or not the MP-SDMA can be used, and similarly, that the channel state information is OK or NG. In this manner, as repeating the hearing several times, the mobile station repeatedly notifying the channel state information of NG is considered as a candidate for the MIMO-TDMA or the SDMA-TDMA because of having a tendency of the channel state information inappropriate for the MP-SDMA processing.

In the channel state information, the MP-SDMA processing is inappropriate for the mobile station when variation of the channel state information of the mobile station is large to the adjacent base station, and the SDMA-TDMA processing is also inappropriate when variation of correlation of the channel state information with the other mobile station included in the SDMA group is large even if the SDMA-TDMA processing is performed, and therefore, the MIMO-TDMA processing is preferable.

Figure 12:
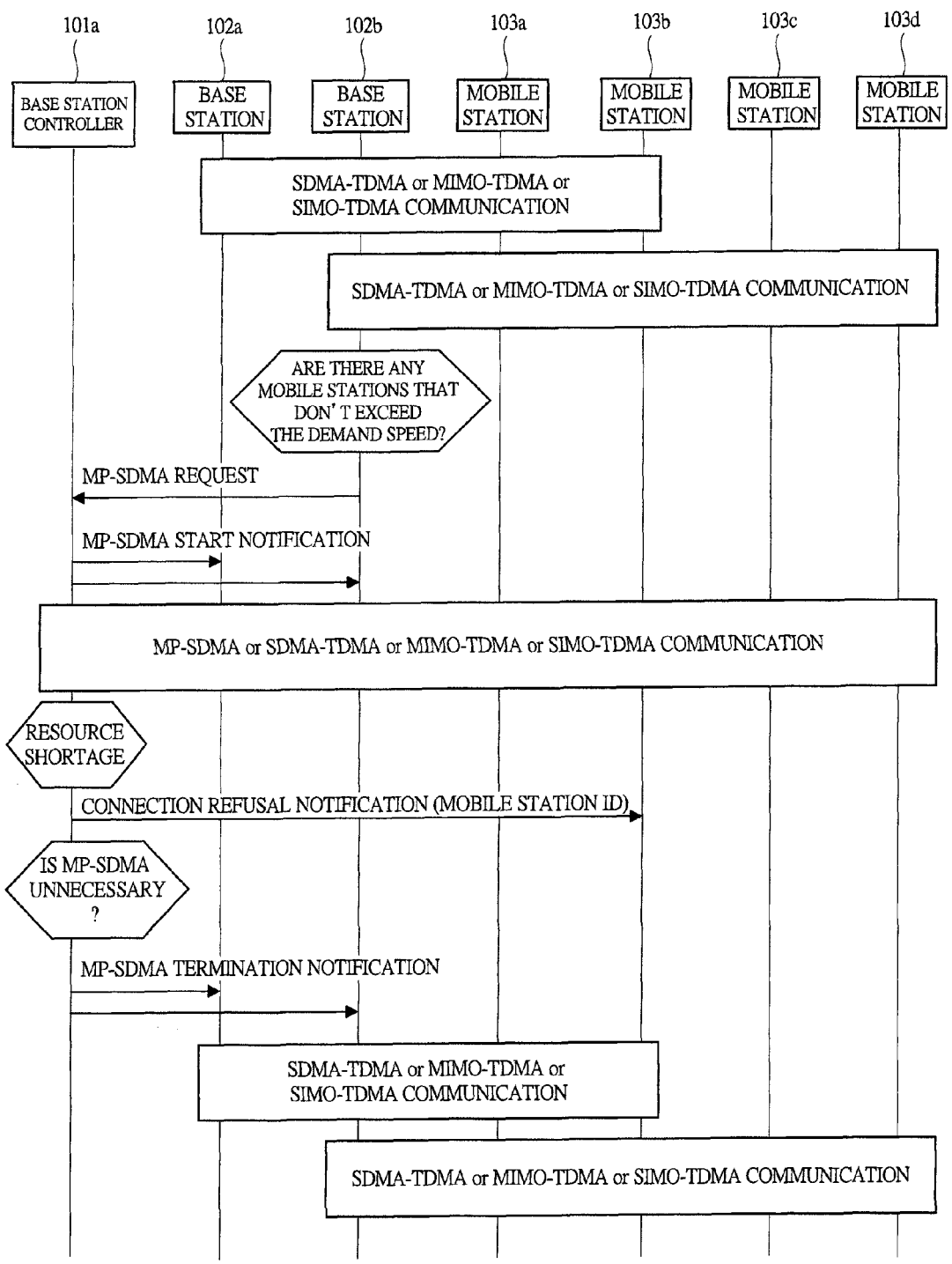
FIG. 12 is a diagram illustrating an example of a control sequence relating to a dynamic operation such as shifting to or termination from the multipoint SDMA communication according to the embodiment of the present invention.

FIG. 12 illustrates an example of a control sequence relating to a dynamic operation such as shifting to or termination from the multipoint SDMA communication according to the embodiment of the present invention.

When the demand speed from the mobile stations 103*a*, 103*b*, 103*c*, and 103*d* is small, the demand speed is exceeded by performing the SDMA-TDMA communication, the MIMO-TDMA communication, or the SIMO-TDMA communication with the associated mobile stations by the base stations 102*a* and 102*b*. In this case, when the same frequency resource is used by the base stations 102*a* and 102*b*, the base stations 102*a* and 102*b* communicates with each other in time division.

When the demand speed of the mobile station is exceeded, the above-described communication is continued. However, for example, when it is detected here that the demand speed is not exceeded in the mobile station 103*b* associated with the base station 102*b*, a control message for a MP-SDMA request is transmitted from the base station 102*b* to the base station controller 101*a*, and the base station controller 101*a* transmits a control message for an MP-SDMA start notification to the base stations 102*a* and 102*b* based on the information of the base station or others whose periphery can be caught by the mobile station not exceeding the demand speed, so that the MP-SDMA communication, the SDMA-TDMA communication, the MIMO-TDMA communication, or the SIMO-TDMA communication, which are mainly controlled by the base station controller 101*a*, is performed.

When the demand speed of the mobile station cannot be exceeded even if the MP-SDMA communication is performed, the base station controller 101*a* judges resource shortage, and decided the mobile station which exceeds the demand speed in the entire system based on the priority information of the connection maintenance which the mobile station has, by disconnecting the mobile station having a low priority. To the mobile station to be disconnected, a control message for a connection refusal notification is notified, and the connection link is cut off. The disconnected mobile station stands by for a certain period of time, and then, tries the connection request again. However, the base station controller 101*a* refuses the connection for the new connection request when a margin for providing the system capacity is not sufficient, or accepts the connection when the margin is sufficient.

Further, when a state in which the demand speed of the mobile station is exceeded continues for N slots even if the MP-SDMA communication is not performed, the base station controller 101*a* judges that the MP-SDMA processing is unnecessary, and notifies a MP-SDMA termination notification message to the base stations 102*a* and 102*b*, so that the base stations 102*a* and 102*b* perform the SDMA-TDMA communication, the MIMO-TDMA communication, or the SIMO-TDMA communication to their associated mobile stations.

Figure 13:
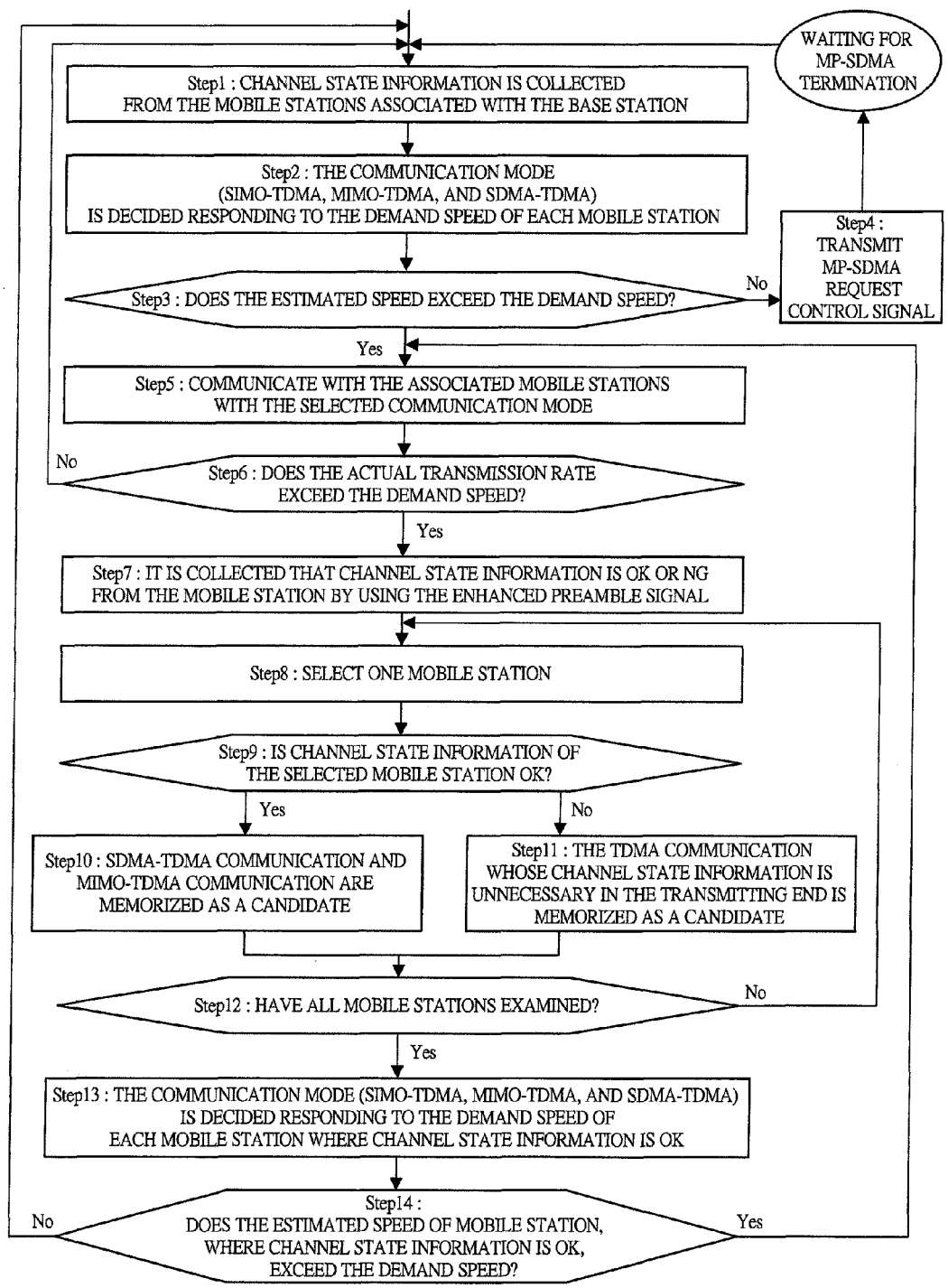
FIG. 13 is a diagram illustrating an example of a control algorism of a base station according to the embodiment of the present invention.

FIG. 13 illustrates an example of a control algorism of the base station according to the embodiment of the present invention.

First, the channel state information is collected from the mobile station associated with the base station (Step 1). The SIMO-TDMA communication, the MIMO-TDMA communication, or the SDMA-TDMA communication is decided by using the formulas (1) to (4) from the collected channel state information and the demand speed of each mobile station (Step 2). It is judged whether or not the estimated speed of the associated mobile station exceeds the demand speed (Step 3). If it is not exceeded (No), the control massage for the MP-SDMA processing request is transmitted to the base station controller (Step 4), and a waiting state for the MP-SDMA termination is transmitted from the base station controller.

When the control message for the termination notification of the MP-SDMA communication is received from the base station controller, the first step (Step 1) of the collection of the channel state information from the mobile station is started again.

If, as the result of the judgment in Step 3, the estimated speed exceeds the demand speed (Yes) in all the associated mobile stations so as to satisfy the formulas (1) to (4), the base station communicates with the associated mobile stations by the selected communication mode (Step 5) in performing the SIMO-TDMA communication, the MIMO-TDMA communication, or the SDMA-TDMA communication are performed. The processing from Step 1 is repeated until the actual speed exceeds the demand speed (Step 6). Alternatively, even when a ratio of the mobile stations whose actual speed exceeds the demand speed is not 100%, if the ratio exceeds a predetermined ratio, the processing may proceed to Step 7. In a next time slot in which the selected communication has been performed, first, it is judged that the channel state information which the base station currently uses is OK or NG by the mobile station with using the enhanced preamble signal, and the information on the judgment result is collected (Step 7).

Then, one mobile station is selected (Step 8), and it is judged whether or not the channel state information of the mobile station is OK (Step 9). If the channel state information is NG (No), it is judged that the MIMO and SDMA communications are not effective for the mobile station, and the mobile station is memorized as a candidate for the TDMA communication in which the channel state information is unnecessary on the transmitting end (Step 11). For example, on the mobile station end, the SIMO-TDMA communication or others which performs only a diversity technique for maximal-ratio combining is performed.

If the channel state information is OK (Yes), the mobile station is memorized as a candidate for the SDMA-TDMA communication or the MIMO-TDMA communication (Step 10). The processing from Step 8 is repeated until all the mobile stations are memorized as a candidate for any communication mode (Step 12). Based on the memorized communication candidate, in the mobile station whose channel state information is OK, any one of the SIMO-TDMA communication, the MIMO-TDMA communication, and the SDMA-TDMA communication is decided based on the formulas (1) to (4) (Step 13). Another embodiment for reducing an amount of this calculation will be described.

With reference to the communication mode in the previous time slot, for example, when the SDMA-TDMA communication has been performed at the previous time, it may be judged that the SDMA-TDMA communication is to be continued if the channel state information of all the mobile stations belonging to a group for the SDMA is OK. Similarly, when the MIMO-TDMA communication has been performed at the previous time, it is judged that the MIMO-TDMA communication is to be continued if the channel state information is OK as long as the channel state information is OK, so that the communication mode performed in the previous time slot is continued.

For the communication mode decided as described above, it is judged whether or not the estimated speed of the mobile station whose channel state information is OK exceeds the demand speed (Step 14). More specifically, it is judged whether or not the formulas (1) to (4) are satisfied. If the estimated speed of the mobile station whose channel state information is OK does not exceed the demand speed (No), the processing returns to the first Step 1. If the estimated speed of the mobile station whose channel state information is OK exceeds the demand speed (Yes), the processing returns to Step 5, and communication is performed to all the mobile stations whose channel state information is OK or NG with using the selected communication mode. Even here, even if the rate in which the estimated speed of the mobile station whose channel state information is OK exceeds the demand speed is not 100%, the processing may return to Step 8 if the rate exceeds a predetermined rate.

Figure 14:
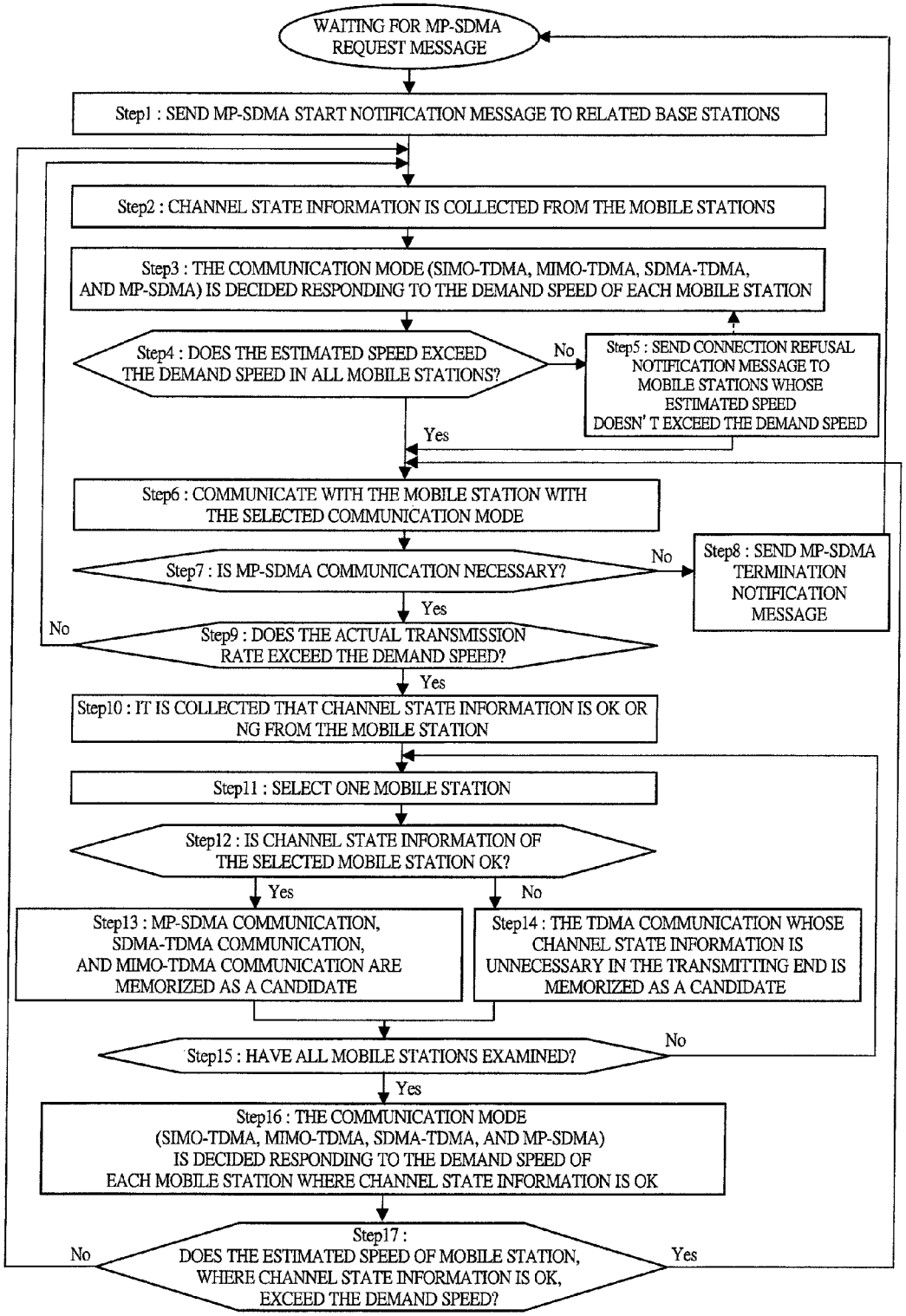
FIG. 14 is a diagram illustrating an example of a control algorism of a base station controller according to the embodiment of the present invention.

FIG. 14 illustrates an example of a control algorism of the base station controller according to the embodiment of the present invention. The base station controller waits for an MP-SDMA request message from the base station.

When the MP-SDMA request message is transmitted from the base station, the MP-SDMA start notification message is issued to the related base station (Step 1) based on the base station ID described in the preamble signal received by the mobile station associated with the base station to which the request is issued. When each base station receives the MP-SDMA start notification message, each base station switches so that the signal from the base station controller is directly transmitted to the antenna.

Subsequently, the related base station transmits the preamble signal to collect the channel state information from each mobile station (Step 2). Based on the collected channel state information, the communication mode which is the SIMO-TDMA communication, the MIMO-TDMA communication, the SDMA-TDMA communication, or the MP-SDMA communication is decided responding to the demand speed of each mobile station with using the formulas (1) to (6) (Step 3).

It is judged whether or not the estimated speed of all the mobile stations exceeds the demand speed (Step 4). If a mobile station not exceeding exists (No), a connection refusal notification message is transmitted to the mobile station whose estimate speed does not exceed the demand speed (Step 5). In a method of selecting this mobile station, the connection is simply refused to all the mobile stations whose estimated speed does not exceed the demand speed, and the processing may proceed to a next Step 6.

Alternatively, a priority has been previously decided for each mobile station by authentication protocol or others, the connection is refused to a mobile station in order of a low priority, the communication mode of Step 3 is re-calculated without connecting the mobile station, and the processing loop from Step 3 to Step 5 may be repeated at Step 4 until the mobile station whose estimated speed does not exceed the demand speed does not exist. Alternatively, as the priority, magnitude of a difference between the estimated speed and the demand speed may be used. The connection may be refused to a mobile station in order of a large difference or a small difference.

Next, the communication is performed with the mobile station whose estimated speed exceeds the demand speed by the selected communication mode (Step 6). Subsequently, it is judged whether or not the MP-SDMA communication is available as the selected mode (Step 7). For example, when it is found that the demand speed of the mobile station is exceeded by the SDMA-TDMA communication, the MIMO-TDMA communication, or the SIMO-TDMA communication (No) even without continuously performing the MP-SDMA communication for N times, the MP-SDMA is judged to be unnecessary, and the MP-SDMA termination notification message is transmitted to each base station (Step 8), and the processing returns to the waiting state for the MP-SDMA.

When it is judged that the MP-SDMA communication is necessary (Yes), it is judged whether or not the actual transmission rate has exceeded the demand speed (Step 9) with using the result obtained by the communication at Step 6. If the actual transmission rate does not exceed the demand speed (No), the processing returns to Step 2.

When the actual transmission rate exceeds the demand speed (Yes), the communication is performed in a next time slot by judging the channel state information stored in the base station controller as either OK or NG, so that the feedback volume can be reduced. More specifically, it is collected either OK or NG for the channel state information from the mobile station with using the enhanced preamble signal (Step 10).

Here, even when the rate in which the actual transmission rate exceeds the demand speed is not 100%, the processing may proceed to Step 10 if the rate exceeds a predetermined rate. Otherwise, the processing may proceed to Step 2.

One mobile station is selected (Step 11), and it is judged whether or not the channel state information of that mobile station is OK (Step 12). If OK (Yes), that mobile station is memorized as a candidate for the MP-SDMA communication, the SDMA-TDMA communication, or the MIMO-TDMA communication (Step 13).

If the channel state information is NG (No), the mobile station is memorized as a candidate for the TDMA communication which is the communication mode that the transmitting end does not need to acquire the channel state information (Step 14). For example, in the SIMO-TDMA communication, the receiving end is mentioned as a candidate or others for the communication of performing maximal-ratio combining or selective combining of the antenna diversity technique.

It is judged whether or not all the mobile stations are judged (Step 15), and if any mobile station not judged yet still exists (No), the processing returns to Step 11. If all the mobile stations are judged (Yes), the SIMO-TDMA communication, the MIMO-TDMA communication, the SDMA-TDMA communication, or the MP-SDMA communication is decided by calculating whether or not the formulas (1) to (6) are satisfied for the mobile station whose channel state information is OK (Step 16).

In each communication mode, it is judged whether or not the estimated speed exceeds the demand speed for the mobile station whose channel state information is OK (Step 17). If the estimated speed exceeds the demand speed (Yes), the processing returns to Step 6, and the communication is performed with the mobile station by the selected mode. If the estimated speed does not exceed the demand speed (No), the processing returns to Step 2, and the channel state information is collected from the mobile station.

Here, even if the rate in which the estimated speed exceeds the demand speed for the mobile station whose channel state information is OK is not 100%, the processing may return to Step 6 if the rate exceeds a predetermined rate. Otherwise, the processing may return to Step 2.

Figure 15:
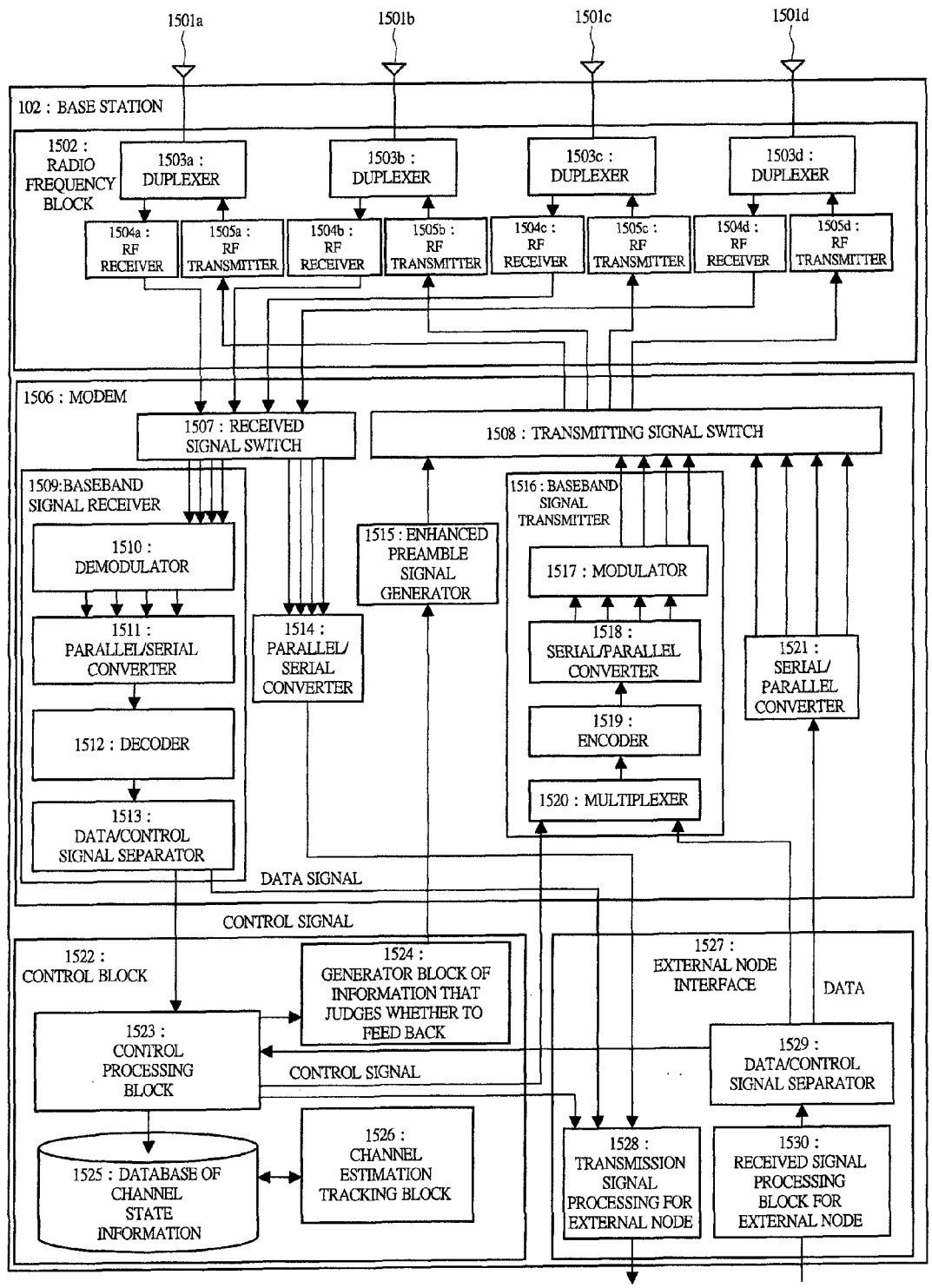
FIG. 15 is a diagram illustrating an example of a structure of the base station according to the embodiment of the present invention.

FIG. 15 illustrates an example of a structure of the base station according to the embodiment of the present invention. The base station 102 (corresponding to 102a and 102b in FIG. 1) includes: antennas 1501 (1501a to 1501d); a radio frequency block 1502; a modem 1506; a control block 1522; and an external node interface 1527.

The radio frequency block 1502 includes: duplexers 1503 (1503a to 1503d) having transmission/reception changeover function which is connected to the antenna 1501; an RF receiver 1504 (1504a to 1504d) which is connected to the duplexer 1503; and an RF transmitter 1505 (1505a to 1505d) which is connected thereto. The RF receiver 1504i (i=a to d) performs a filtering processing to a received signal transmitted from the antenna 1501i, and converts the signal into an analog signal with a baseband band, and then, converts the signal into a digital signal (A/D conversion), and output the signal to the modem 1506. On the other hand, the RF transmitter 1501*i* (i=a to d) converts the digital signal outputted from the modem 1506 into an analog signal (D/A conversion), and performs conversion of a frequency band and power amplification, and then, outputs the signal to the duplexer 1503*i*.

The modem 1506 includes: a received signal switch 1507; a transmitting signal switch 1508; a baseband signal receiver 1509; a baseband signal transmitter 1516; an enhanced preamble signal generator 1515; a parallel/serial (P/S) convertor 1514; and serial/parallel (S/P) convertor 1521.

The received signal switch 1507 functions as a switch for switching either the received signal being the output from the radio frequency block 1502 is processed by the baseband signal receiver 1509 within the base station or the received signal is passed through without any change and the passing is notified to the base station controller via the external node interface 1527.

When the received signal is passed through and the passing is notified to the base station controller, the received signal is converted into a serial signal by the parallel/serial convertor 1514, and then, the signal is converted into a signal by a transmission signal processing block for external node 1528 in the external node interface 1527 so as to match the communication mode between the base station and the base station controller, and the passing is notified. The base station and the base station controller are connected with each other by an optical communication module, Ethernet, or an exclusive line.

The baseband signal receiver 1509 includes: a demodulator 1510; a parallel/serial convertor 1511; a decoder 1512; and a data/control signal separator 1513. When a signal processing is performed to the received signal by the baseband signal receiver 1509, a demodulation processing for the SIMO, the MIMO, or the SDMA is performed by the demodulator 1510. In the demodulation for the SIMO, for example, a signal obtained by the maximal-ratio combining is demodulated by the OFDM. In the example of the MIMO signal processing, a demodulation processing in the eigenmode transmission is performed, or a demodulation processing in Zero Forcing, MMSE (Minimum Mean Square Error), or MLD method is performed. Also in the SDMA, a well-known demodulation processing in Block Diagonalization, Tomlinson Harashima Precoding, or others is performed.

A stream signal outputted from the demodulator 1510 is returned to a serial signal by the parallel/serial convertor 1511, and an error correction processing is performed to this serial signal by the decoder 1512. For the error correction processing, a method such as Viterbi decoding, Turbo decoding, and LDPC decoding may be used. In the data/control signal separator 1513, it is judged that the decoded received-signal is either a data signal for data communication or a control signal for signaling protocol by checking a header part, and the control signal is outputted to the control block 1522. If the signal is the data signal, the signal is outputted to the external node interface 1527, is converted by the transmission signal processing block for external node 1528, and is data-transmitted to the base station controller or a device such as other router of receiving the data.

The transmitting signal switch 1508 switches between an output signal from the baseband signal transmitter 1516 and an outputted signal obtained by performing the serial/parallel conversion to a signal outputted from the base station controller by the serial/parallel convertor 1521 via the external node interface 1527. When the multipoint SDMA communication is handled, the base station is switched over to the base station controller.

The enhanced preamble signal generator 1515 acquires the feedback judgment information from the control block 1522, and adds this information to the preamble signal, so that the enhanced preamble signal described with reference to FIG. 9 is generated. More particularly, if it is not necessary to add the feedback judgment information thereto, only the preamble signal is generated.

The baseband signal transmitter 1516 includes: a modulator 1517; a serial/parallel convertor 1518; an encoder 1519; and a multiplexer 1520. The control signal and the data signal are multiplexed by the multiplexer 1520, and an encoding processing is performed in the encoder 1519 so that the error correction can be performed on the receiving end. For the encoding processing, Viterbi encoding, Turbo encoding, LDPC encoding, or others may be used. In this example, an outputted signal from the encoder 1519 is separated into four data streams by the serial/parallel convertor 1518, and a modulation processing based on the OFDM is performed for the SIMO, the MIMO, or the SDMA by the modulator 1517. Such a modulation processing as the demodulation processing described above is performed, and the modulation is performed by the same communication mode as the demodulation processing at the receiver of the mobile station. In the modulation processing, a signal processing is performed with using the channel state information between the base station and the mobile station. A database of channel state information 1525 included in the control block 1522 is stored on a physical memory, and the channel state information is fetched by accessing to this memory, and a transmission wait queue or others is calculated from this channel state information.

The control block 1522 includes: a control signal processing block 1523; a generator block of information that judges whether to feed back 1524; and a channel estimation tracking block 1526. The data handled by this control block 1522 includes a database of the "database of channel state information" 1525.

The control signal processing block 1523 executes the control algorism described above with reference to FIG. 13, and executes a control flow illustrated in FIGS. 2, 3, 4, 11, and 12. The "generator block of information that judges whether to feed back" 1524 generates the feedback judgment information described with reference to FIG. 10 responding to a state of the control signal processing block 1523. For example, a feedback mode in a case of collecting the channel state information by the base station from all the mobile stations is decided, or a feedback mode in a case of collecting only OK or NG from the channel state information is decided. Further, with reference to the database of the "database of channel state information" 1525, the mobile station ID, the used channel ID, and others in FIG. 10 are decided. Values of other contents are decided, when the base station is activated, by referring to the setting information stored in a non-volatile memory or others.

The "database of channel state information" 1525 stores the channel state information for each mobile station such that, when the number of antennas of the base station is "N" lines and the number of antennas of the mobile stations is "M" lines, one piece of the channel state information is an N×M matrix, and L pieces of this channel state information is stored. A component of each matrix represents a channel impulse response which is obtained by expressing an IQ signal with using a complex number.

A channel estimation tracking block 1526 estimates in what state at a present time the channel state information having been used by the base station in past is, adds the information on this estimation result to the database of channel state information 1525, and returns it. As an estimation algorism, a method such as weighted calculation for a prediction filter of channel variation is known if it is assumed that a temporal-variability factor follows the Jake's model, and the predicted result is calculated in accordance with this method. Note that the channel estimation tracking block 1526 may be not included in the structure. A weighted filter may be restructured to be learned so that a difference between a result estimated with using a weighted filter for the prediction and the occasionally-collected channel state information is minimized.

The external node interface 1527 includes: a data/control signal separator 1529; a transmission signal processing block for external node 1528; and a received signal processing block for external node 1530. The transmission signal processing block for external node 1528 multiplexes an output signal from the parallel/serial convertor 1514 in the modem 1506, an output data signal from the baseband signal receiver 1509, a control signal from the control block 1522, and others, and transmits a signal to the base station controller or other communication device. The received signal processing block for external node 1530 performs a received signal processing to a signal transmitted from the base station controller and a received signal from other communication device, and then, separates the date signal and the control signal by the data/control signal separator 1529, and transfers the data signal to the modem 1506 and the control signal to the control block 1522.

Figure 16:
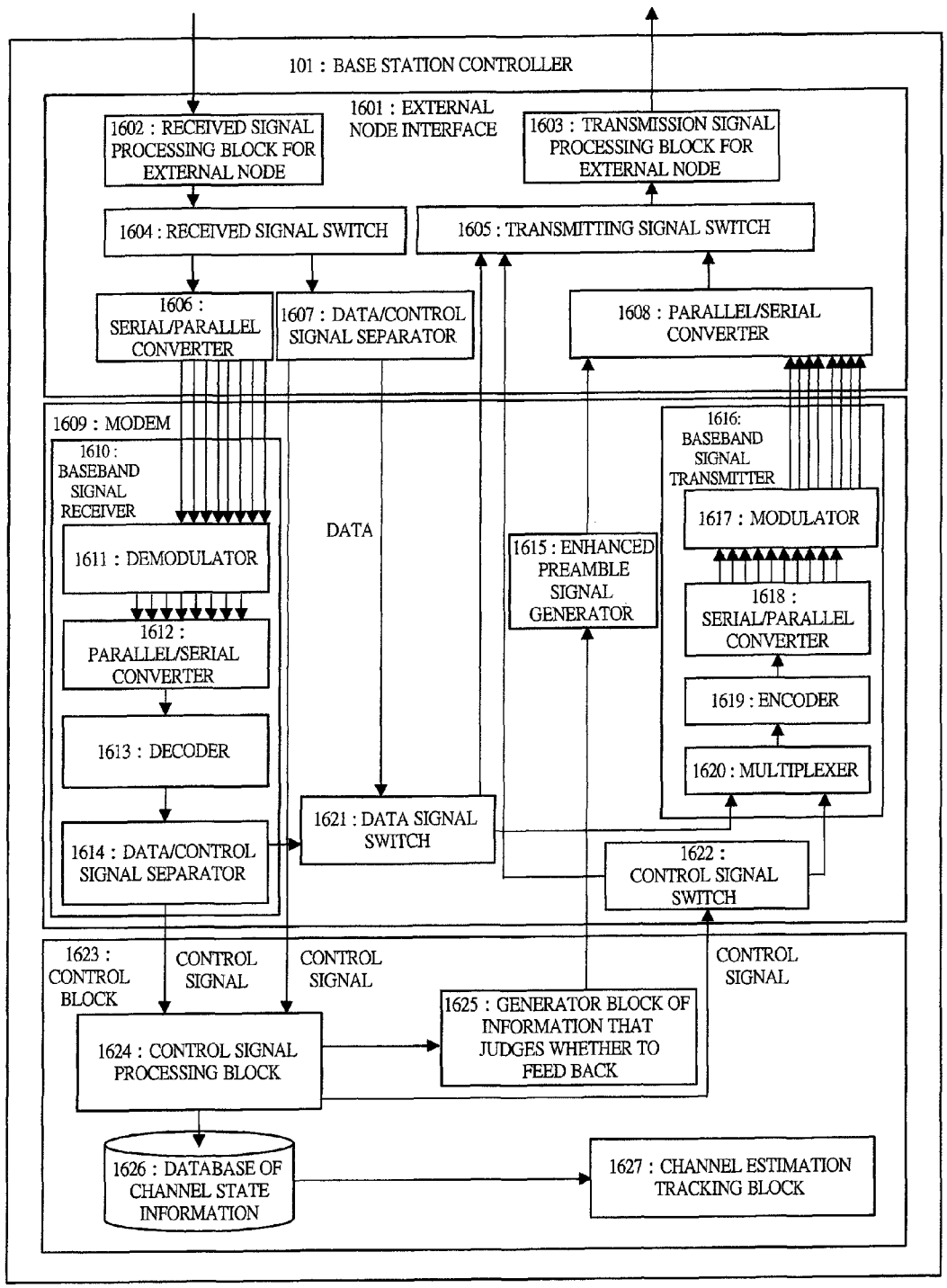
FIG. 16 is a diagram illustrating an example of a structure of the base station controller according to the embodiment of the present invention.

FIG. 16 illustrates an example of a structure of a base station controller according to the embodiment of the present invention. A base station controller 101 (corresponding to 101a in FIG. 1) includes: an external node interface 1601; a modem 1609; and a control block 1623.

The external node interface 1601 includes: a received signal processing block for external node 1602; a transmission signal processing block for external node 1603; a received signal switch 1604; a transmitting signal switch 1605; a serial/parallel convertor 1606; a data/control signal separator 1607; and a parallel/serial convertor 1608.

A received signal from the base station is processed by the received signal processing block for external node 1602, and is separated by the received signal switch 1604 into either a signal for which a baseband signal receiver 1610 in the modem 1609 is used or a signal for which it is not used. When a demodulation processing or a decoding signal processing for a radio section is performed by the base station controller 101 instead of the base station 102, the baseband signal receiver 1610 is required.

The signal outputted to the data/control signal separator 1607 by the received signal switch 1604 in the external node interface 1601 is separated into the control signal or the data signal by analyzing the header information in the data/control signal separator 1607, and the control signal is outputted to a control signal processing block 1624 in the control bock 1623. When it is the data signal, the signal is transferred to a data signal switch 1621 in the modem 1609. By the data signal switch 1621, the transferred signal may be transferred as a return signal to the transmitting signal switch 1605 in the external node interface 1601, or the signal may be transferred to the baseband signal transmitter 1616 in the modem 1609 in order to transmit a modulated signal in the radio section. The transmitting signal switch 1605 selects the signal returned by the data signal switch 1621 in the modem 1609 or a signal which is a serial signal converted by the parallel/serial converter 1608 from the signal modulated by the baseband signal transmitter 1616 in the modem 1609, and transfers the selected signal to the transmission signal processing block for external node 1603. The transmission signal processing block for external node 1603 transmits the received signal to the base station or other communication device as the data signal or the control signal.

The modem 1609 includes: the baseband signal receiver 1610; the baseband signal transmitter 1616; an enhanced preamble signal generator 1615; the data signal switch 1621; and a control signal switch 1622. The baseband signal receiver 1610 and the baseband signal transmitter 1616 have basically the same function as the baseband signal receiver 1509 and the baseband signal transmitter 1516 in the base station 102. That is, the baseband signal receiver 1610 includes: a demodulator 1611; a parallel/serial convertor 1612; a decoder 1613; and a data/control signal separator 1614. Further, the baseband signal transmitter 1616 includes: a modulator 1617; a serial/parallel convertor 1618; an encoder 1619; and a multiplexer 1620. This structure is different in that parallelism of the serial/parallel conversion and the parallel/serial conversion is increased so as to correspond to a total number of antennas of the base stations.

The control block 1623 includes: a control signal processing block 1624; a generator block of information that judges whether to feed back 1625; and a channel estimation tracking block 1627. A data handled by this control block 1623 includes a "database of channel state information" 1626.

The control signal processing block 1624 performs the operation of the control algorism described with reference to FIG. 14, and executes the control flow illustrated in FIGS. 2, 3, 4, 11, and 12. As a control signal handled by the control signal processing block 1624, a signal acquired via the baseband signal receiver 1610 in the modem 1609, a signal transmitted from the data/control signal separator 1607 in the external node interface 1601, and others are received. When the multipoint SDMA processing is performed, the baseband signal receiver 1610 of the modem 1609 is required. However, the control signal transmitted from the control block 1522 of the base station 102 is transferred to the control block 1623 via the latter data/control signal separator 1607. The control signal generated by the control signal processing block 1624 in the control block 1623 is transferred to be outputted the baseband signal transmitter 1616 via the control signal switch 1622 in the modem 1609, or to be directly outputted to the transmitting signal switch 1605 in the external node interface 1601.

The database of channel state information 1626, the generator block of information that judges whether to feed back 1625, and the channel estimation tracking block 1627 have the same function as described for the base station. An enhanced preamble signal is generated by the enhanced preamble signal generator 1615 based on the information generated by the generator block of information that judges whether to feed back 1625, and is transmitted via each base station.

FIG. 17 illustrates an example of a structure of a mobile station according to the embodiment of the present invention. A mobile station 103 (corresponding to 103a to 103d in FIG. 1) includes: antennas 1701a and 1701b; a radio frequency block 1702; a modem 1706; a control block 1718; and an external node interface 1724.

The radio frequency block 1702 is illustrated as a block structure having the same function as described for the base station 102. That is, the radio frequency block 1702 includes: duplexers 1703a and 1073b; RF receivers 1704a and 1704b; and RF transmitters 1705a and 1705b. While the example of FIG. 17 shows a case that the number of antennas is two, the structure is the same as the base station in a case of four antennas.

The modem 1706 includes: a baseband signal receiver 1707; and a baseband signal transmitter 1713. The baseband signal receiver 1707 has basically the same structure as the baseband signal receiver 1509 in the base station. That is, the baseband signal receiver 1707 includes: a demodulator 1709; a parallel/serial converter 1710; a decoder 1711; and a data/control signal separator 1712. The demodulator 1709 performs channel estimation when it receives a preamble signal for a demodulation processing. A result of this channel estimation is stored as a database of channel state information 1721 in the control block 1718.

The baseband signal transmitter 1713 also has the same structure as the baseband signal transmitter 1516 in the base station. That is, the baseband signal transmitter 1713 includes: a modulator 1714; a serial/parallel converter 1715; an encoder 1716; and a multiplexer 1717.

The control block 1718 includes: a control signal processing block 1719; a judgment block of channel state information feedback mode 1720; and a channel estimation tracking block 1722. A data handled by the control block 1718 includes a database of channel state information 1721 and a database of decoding error rate 1723. The database of channel state information 1721 stores the channel estimation result of the demodulator 1709 as a database. For this data, the channel estimation tracking block 1722 estimates temporal variability, and performs the same operation as the channel estimation tracking block 1526 in the base station. Also, it is necessary to provide a weighting filter for prediction in the base station in order to acquire the same result as the base station. This weighting filter is previously provided between the base station and the mobile station with using a protocol. In addition, the channel estimation tracking block 1722 may not be included in the structure.

The control signal processing block 1719 executes the control flow illustrated in FIGS. 2, 3, 4, 11, and 12. In accordance with the feedback judgment information specified by the base station, the channel state information may be notified to the base station or the judgment result either the channel state information is OK or NG may be notified.

A method of judging either the channel state information is OK or NG will be described below. First, the feedback judgment type and the feedback judgment threshold are extracted from a format of the feedback judgment information described with reference to FIG. 10. When a channel correlation coefficient is specified in the feedback judgment type, the correlation coefficient is acquired as follows, and is judged by comparison with the threshold. More specifically, by the database of channel state information 1721, the channel state information which the base station uses and the channel estimation result outputted from the demodulator 1709 for a latest preamble signal are referred. For example, by representing a component with i row and j column of a response matrix of a channel estimation result in a subcarrier "k" of an OFDM signal at time "t" as $H_{ijk}(t)$ and representing the information at time "t–τ" of the channel state information which the base station uses as $H_{ijk}(t-\tau)$ the correlation coefficient is calculated by a following formula (7). And, OK is notified when the correlation coefficient is equal to or larger than the threshold. Otherwise, NG is notified.

$$\rho = \frac{A[Hijk(t)H'ijk(t-\tau)]}{\sqrt{(A[Hijk(t)H'ijk(t)])(A[Hijk(t-\tau)H'ijk(t-\tau)])}} \quad \text{Formula (7)}$$

Here, "A [*]" represents a sample mean of N samples with using N samples of the data acquired by returning from time t to the past. Here, "H'" represents a complex conjugate transposed matrix for a channel "H".

Next, a method of judging either the channel state information is OK or NG when the feedback judgment type described with reference to FIG. 10 specifies the decoding error rate will be described. In this case, the database of decoding error rate 1723 is referred. The decoding error rate is measured by a decoding error rate measurement block 1725 in the external node interface 1724. In this measurement method, a frame error rate which judges whether or not the decoding error rate is correct in a frame unit by CRC judgment is calculated, and its result is notified. Other measurement method is to embed an already-known pattern into the data signal and calculate a number shifted between the pattern result and a decoded result. Alternatively, as the data of the error rate, the number of bits may be used, the number of bits being in error correction by coding a decoded data signal again and acquiring a difference between the coded data and an input signal of the decoder. By comparing the error rate of the data judged as described above with the feedback judgment threshold, the channel state information is judged as NG if the error rate is larger than the threshold, and the channel state information is judged as OK if smaller than the threshold.

The external node interface 1724 has an interface connected to, for example, a microphone or a speaker as, for example, an input/output device in the mobile station. When it functions as an audio terminal, it mounts a processing of a codec 1726 to communicate data with the modem 1706.

FIG. 18 illustrates an example (example that the base station measures the channel state information with a signal transmitted from the mobile station) of a control sequence according to another embodiment of the present invention. In the above-described embodiment, such a function is provided for the mobile station, in which the mobile station having received the preamble signal from the base station performs the channel estimation to acquire the channel state information, and notifies the channel state information to the base station or judges either the channel state information is OK or NG. However, in another embodiment illustrated in FIG. 18, an example that this function is provided for the base station is described. Since the base station also has the demodulator 1510 (FIG. 15), the same operation can be performed by using the channel estimation result.

First, in a channel state information collecting period, the base station 102a notifies a control message for preamble signal request. At this time, a transmission judgment processing is performed, in which the mobile stations 103a, 103b, 103c, and 103d judge the same result with using the enhanced preamble signal as judged that the channel state information is OK or NG, and the mobile station transmits the preamble signal only when the channel state information is judged as OK. Without performing this transmission judgment processing for the preamble signal, the preamble signals may be sequentially transmitted from all the mobile stations. However, when the number of the contained mobile stations is large, by previously focusing on the mobile stations whose channel state information is OK and transmitting their preamble signals, time for the reception of the preamble signals by the base station can be relatively short.

For example, when the mobile station 103a decides to transmit the preamble signal in the transmission judgment processing for the preamble signal, a transmission frequency is changed. If the system is a TDD (Time Division Duplex) system with using the same frequency in a down-stream signal from the base station to the mobile station and an up-stream signal from the mobile station to the base station, it is not necessary to change the frequency. In an FDD (Frequency Division Duplex) system with using a different frequency in the up-stream signal and the down-stream signal, in order to acquire the channel state information used in the down-stream signal, by changing the frequency into that of a signal used in the down-stream signal and then transmitting the preamble signal, the base station having received the preamble signal can acquire the same channel estimation result as the channel state information of the down-stream signal. Similarly, the mobile stations 103b, 103c, and 103d also transmit the preamble signals to collect the latest channel state information by the channel estimation.

Next, in the time slot #1 (MP-SDMA), by obtaining the correlation coefficient between the channel state information acquired in the channel state information collecting period and the channel state information which the base station uses from the formula (7), the channel state information is judged as OK if the correlation coefficient is equal to or larger than the threshold. Otherwise, the channel state information is judged as NG. Then, the result of the channel state information of OK/NG is exchanged between the base stations 102a and 102b. A transmission processing for the MP-SDMA is performed with using the channel state information of OK to transmit the SDMA data signal to each mobile station. At this time, since the base station 102a collects the channel state information from not only the contained associate mobile stations but also the other mobile stations, the MP-SDMA signal processing can be performed by the base station 102a, so that a signal processing can be performed without via the base station controller 101a. Obviously, the MP-SDMA signal processing can be also performed by the base station controller 101a.

FIG. 19 illustrates an example of a control sequence in a case that a base station autonomously decides a multipoint SDMA communication, according to another embodiment of the present invention.

In this sequence, in a channel state information collecting period, the mobile station transmits the preamble signal with using a frequency of a down-stream signal from the base station 102a to the mobile stations 103a, 103b, 103c, and 103d. In this manner, the base station can acquire the channel state information for all the mobile stations which can be communicated by the down-stream signal.

Next, in a communication mode deciding period, based on the channel state information collected in the channel state information collecting period, it is calculated which one of the SIMO-TDMA communication, the MIMO-TDMA communication, and the SDMA-TDMA communication exceeds the demand speed for the associated mobile station with using the formulas (1) to (4), and decides the communication mode.

The base station 102a detecting that the communication speed demanded by the associated mobile station cannot be exceeded issues an MP-SDMA request message to a surrounding base station 102b as a broadcast message. On this control signal, an ID list of mobile stations which are targets for the MP-SDMA is described. The surrounding base station 102b receives the MP-SDMA request message, checks the ID list of mobile stations, and, if the participation for the MP-SDMA is possible, transmits a notification of being possible to participate in the MP-SDMA to the base station 102a which has requested to the surrounding base station 102b. As this control signal, the mobile station ID and the channel state information for the mobile station ID are notified.

Since the channel state information relating to the mobile station is collected from the base station probably performing the MP-SDMA to the base station 102a, the base station 102a judges whether or not the demand speed of the mobile station is exceeded in the MP-SDMA with using the channel state information. If the demand speed is exceeded, the base station 102a transmits a notification of execution of MP-SDMA to the peripheral base station 102b and the base station controller 101a. If the demand speed is not exceeded, the base station 102a transmits a connection refusal message to the mobile station which does not exceed the demand speed.

When the notification of execution of MP-SDMA is issued, to the base station 102b to be participated in the MP-SDMA communication, the base station 102a which has issued the request notifies the information (all pieces of the channel state information relating to the mobile station or the information for the pre-coding to be performed in the base station) for performing the SDMA signal processing or others, and provides the necessary information about what signal is to be transmitted from an antenna of the base station 102b.

And, in the time slot #1 (MP-SDMA), the base station controller 101a copies the same data signal and transmits it to a plurality of base stations which performs the MP-SDMA communication. Each base station performs an arithmetic processing for the MP-SDMA to generate the SDMA data signal, and transmits the SDMA data signal to the mobile station. In this manner, the base station can autonomously perform the MP-SDMA communication.

Note that, in the communication mode deciding period which is a phase for collecting the channel state information, a method for reducing the feedback information as described with reference to FIG. 18 may be used.

Effects obtained by the embodiment and another embodiment of the present invention as described above can be summarized as follows.

(1) The communication mode can be appropriately switched for exceeding the demand communication speed of the mobile station, and resources in the radio section can be used responding to the demand speed as needed. More particularly, in the multipoint SDMA communication which performs simultaneous communication with a plurality of mobile stations by the coordination of the plurality of base stations with each other, there is an effect of increasing the system capacity which cannot be supported by one base station by apparently providing the large number of antennas on the transmitting end. By automatically switching between performing the multipoint SDMA communication and performing the SDMA communication or the MIMO communication within one base station, even the traffic not allowed to be contained so far can be contained. Further, it is not necessary at the beginning to fixedly structure the system as the multipoint SDMA communication, and therefore, the multipoint SDMA communication can be automatically and autonomously established between the necessary base stations when the traffic of the mobile station geographical-unevenly occurs, so that the necessary resource can be allocated depending on the distribution of the traffic.

(2) In each communication mode, since it is essentially not necessary to perform the feedback to a user having small variation amount of the channel state information between the transmitting antenna and the receiving antenna, a only data about whether or not the channel state information which the transmitting end uses can be used without any change is fed back, so that the information volume for the feedback can be reduced, and the frequency utilization efficiency per user can be improved by reducing the overhead. More particularly, such a problem as the multipoint SDMA communication is solved, the problem in which the feedback volume of the channel state information is dramatically increased because of increasing the number of a plurality of base stations and mobile stations under their control, and therefore, a merit of the multipoint SDMA communication is reduced due to overhead. Therefore, by solving this problem and obtaining the merit of the multipoint SDMA communication, so that the throughput of the entire system can be improved and the number of users contained within the area can be increased.

In the foregoing, the invention made by the inventors of the present invention has been concretely described based on the embodiments. However, it is needless to say that the present invention is not limited to the foregoing embodiments and various modifications and alterations can be made within the scope of the present invention.

INDUSTRIAL APPLICABILITY

The present invention relates to a wireless communication system. More particularly, the present invention relates to a method for data transmission/reception between a plurality of base stations having a plurality of transmitting/receiving antennas and a plurality of mobile stations associated with each base station.

The invention claimed is:

1. A wireless communication system comprising:
a plurality of base stations having a plurality of antennas;
a plurality of mobile stations having a plurality of antennas; and
a base station controller collectively controlling the plurality of base stations, wherein
the wireless communication system includes:
a first communication mode by which only one of the base stations and one of the mobile stations are communicated with each other;
a second communication mode by which one of the base station and a plurality of the mobile stations are simultaneously communicated with each other; and
a third communication mode by which a plurality of the base stations and a plurality of the mobile stations are simultaneously communicated with each other by coordinating the plurality of the base stations with each other by the base station controller,
the base station collects channel state information between the antenna of the base station and the antenna of the mobile station, judges whether or not a communication speed demanded by each mobile station is exceeded based on a communication capacity of each communication mode calculated from the collected channel state information, and decides any communication mode among the first communication mode, the second communication mode, and the third communication mode based on this judgment result, wherein
the base station includes: an RF transmitter of, via the antenna of the base station, transmitting a preamble signal with an already-known pattern necessary for measuring channel state information between a transmitting antenna and a receiving antenna at the mobile station; and a notifying block for notifying information of specifying a feedback method for deciding how the mobile station feeds back the channel state information, to the mobile station,
the base station transmits the preamble signal and the information of specifying the feedback method to the mobile station, and
the mobile station measures the channel state information by the preamble signal, judges whether or not the measured channel state information is to be fed back in accordance with the information of specifying the feed back method, and feeds back the channel state information to the base station based on this judgment result.

2. The wireless communication system according to claim 1, wherein,
in the third communication mode, when the communication speed demanded by the mobile station is not exceeded, the base station notifies a connection refusal message to the mobile station whose communication speed cannot be exceeded, and limits the number of connection with the mobile station.

3. The wireless communication system according to claim 1, wherein
the feedback method includes: a first method of feeding back only the channel state information to the antenna of the associated base station; a second method of feeding back the channel state information to the antennas of all surrounding the base stations from which the mobile station receives; and a third method of feeding back the information about whether or not the channel state information which the base station uses is to be used without any change.

4. The wireless communication system according to claim 3, wherein,
when the third method is specified as the feedback method, a correlation coefficient between channel state information of a channel estimation result measured by using the preamble signal transmitted by the base station and channel state information which the base station uses for a signal processing is calculated, it is judged that the channel state information which the base station uses can be used without any change if this calculated correlation coefficient is equal to or larger than a threshold or it is judged that the channel state information cannot be used if it is smaller than the threshold, and this judgment result is fed back.

5. The wireless communication system according to claim 3, wherein,
when the third method is specified as the feedback method, an error rate of a received and decoded result is measured, it is judged that the channel state information which the base station uses can be used without any change if this measured error rate is equal to or smaller than a threshold or it is judged that the channel state information cannot be used if it is equal to or larger than the threshold, and this judgment result is fed back.

6. The wireless communication system according to claim 1, wherein
the mobile station includes: a function block of transmitting, from the antenna of the mobile station, a preamble signal with an already-known pattern necessary for measuring channel state information between a transmitting antenna and a receiving antenna at the base station,
the mobile station transmits the preamble signal to the base station with using the same frequency as that used when communication is performed from the base station to the mobile station, and
the base station collects the channel state information from the preamble signal, and decides the communication mode with using this collected channel state information.

7. A wireless communication system comprising:
a plurality of mobile stations having a plurality of antennas; and
a base station controller collectively controlling the plurality of base stations, wherein
the wireless communication system includes:
a first communication mode by which only one of the base stations and one of the mobile stations are communicated with each other;

a second communication mode by which one of the base stations and the plurality of mobile stations are simultaneously communicated with each other; and a third communication mode by which the plurality of base stations and the plurality of mobile stations are simultaneously communicated with each other by coordinating the plurality of base stations with each other by the base station controller, the base station controller collects channel state information between the antenna of the base station and the antenna of the mobile station, judges whether or not a communication speed demanded by each mobile station is exceeded based on a communication capacity of each communication mode calculated from the collected channel state information, and decides any communication mode among the first communication mode, the second communication mode, and the third communication mode based on this judgment result, wherein the base station controller includes an RF transmitter of transmitting, via the base station, a preamble signal with an already-known pattern necessary for measuring channel state information between the antenna of the base station and the antenna of the mobile station at the mobile station and the information of specifying a feedback method for deciding how the mobile station feeds back the channel state information, and the mobile station measures the channel state information by the preamble signal, judges whether or not the measured channel state information is fed back in accordance with the information of specifying the feedback method, and feeds back the channel state information to the base station controller via the base station based on this judgment result.

8. The wireless communication system according to claim 7, wherein, in the third communication mode, when the communication speed demanded by the mobile station is not exceeded, the base station controller notifies a connection refusal message to the mobile station whose communication speed cannot be exceeded, and limits the number of connection with the mobile station.

9. The wireless communication system according to claim 7, wherein the feedback method includes: a first method of feeding back only the channel state information to the antenna of the associated base station; a second method of feeding back the channel state information to the antennas of all surrounding the base stations from which the mobile station receives; and a third method of feeding back the information about whether or not the channel state information which the base station uses can be used without any change.

10. A wireless communication method in a wireless communication system comprising: a base station having a plurality of antennas; a mobile station having a plurality of antennas; and a controller of controlling a plurality of base stations, wherein the base station transmits a preamble signal for measuring channel state information between the antenna of the base station and the antenna of the mobile station at the mobile station, from the antenna of the base station, the mobile station transmits the channel state information between the antenna of the base station and the antenna of the mobile station to the base station, the channel state information corresponding to the preamble signal, and the base station communicates with at least one of the mobile stations in each time slot by any communication mode among a first communication mode by which one of the base stations and one of the mobile stations are communicated with each other, a second communication mode by which one of the base stations and a plurality of the mobile stations are simultaneously communicated with each other, and a third communication mode by which a plurality of the base stations and a plurality of the mobile stations are simultaneously communicated with each other by control of the controller, wherein the base station collects the channel state information between the antenna of the base station and the antenna of the mobile station, the base station judges whether or not a communication speed demanded by each mobile station is exceeded based on a communication capacity of each communication mode calculated from the collected channel state information, and the base station decides any communication mode among the first communication mode, the second communication mode, and the third communication mode based on this judgment result, wherein the base station notifies, to the mobile station, information of specifying a feedback method for deciding how the mobile station feeds back the channel state information, and the mobile stations measures the channel state information by the preamble signal, and feeds back the measured channel state information to the base station in accordance with the information of specifying the feedback method.

11. The wireless communication method according to claim 10, wherein, when the third method is specified as the feedback method, a correlation coefficient between channel state information of a channel estimation result measured by using the preamble signal transmitted by the base station and channel state information which the base station uses for a signal processing is calculated, it is judged that the channel state information which the base station uses can be used without any change if this calculated correlation coefficient is equal to larger than a threshold or it is judged that the channel state information cannot be used if it is equal to or smaller than the threshold, and this judgment result is fed back.

12. The wireless communication method according to claim 10, wherein, when the third method is specified as the feedback method, an error rate of a received and decoded result is measured, it is judged that the channel state information which the base station uses can be used without any change if this measured error rate is equal to or smaller than the threshold or it is judged that the channel state information cannot be used if it is equal to or larger than the threshold, and this judgment result is fed back.

* * * * *